US012040145B2

(12) United States Patent
Bush et al.

(10) Patent No.: US 12,040,145 B2
(45) Date of Patent: *Jul. 16, 2024

(54) CONTACT LEVITATION TRIGGERING MECHANISMS FOR USE WITH SWITCHING DEVICES INCORPORATING PYROTECHNIC FEATURES

(71) Applicant: Gigavac, LLC, Carpinteria, CA (US)

(72) Inventors: Bernard Bush, Santa Barbara, CA (US); Murray Stephan McTigue, Carpinteria, CA (US); Daniel Sullivan, Santa Barbara, CA (US); David Hatch, Monson, MA (US)

(73) Assignee: Gigavac, LLC, Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,797

(22) Filed: Sep. 12, 2022

(65) Prior Publication Data

US 2023/0005685 A1 Jan. 5, 2023

Related U.S. Application Data

(63) Continuation of application No. 17/032,774, filed on Sep. 25, 2020, now Pat. No. 11,443,910.

(Continued)

(51) Int. Cl.
*H01H 39/00* (2006.01)
*F15B 15/19* (2006.01)

(52) U.S. Cl.
CPC ........... *H01H 39/006* (2013.01); *F15B 15/19* (2013.01)

(58) Field of Classification Search
CPC ........ H01H 39/00; H01H 39/006; F15B 15/19
See application file for complete search history.

(56) References Cited

U.S. PATENT DOCUMENTS 2,729,722 A 1/1956 Nelsen
2,999,912 A 9/1961 Kincaid et al.
(Continued)

FOREIGN PATENT DOCUMENTS

CN 102456505 A 5/2012
CN 104704597 A 6/2015
(Continued)

OTHER PUBLICATIONS

French Office Action mailed Nov. 26, 2021 for French Patent Application No. FR2011828, a foreign counterpart to U.S. Appl. No. 17/032,774, 9 pages.

(Continued)

*Primary Examiner* — Jacob R Crum
(74) *Attorney, Agent, or Firm* — Lee & Hayes, P.C.

(57) ABSTRACT

Electrical switching device are disclosed having a housing with internal component within the housing. The internal components comprise contacts configured to operate, to change the state of the switching device from a closed state, allowing current flow through the switching device to an open state which interrupts current flow through the switching device. A pyrotechnic feature is included that is configured to interact with the internal components to transition the switching device from the closed state to the open state when the pyrotechnic feature is activated. The pyrotechnic feature is configured to trigger in response to levitation between the contacts at elevated current signal flowing through the switching device.

20 Claims, 16 Drawing Sheets

Related U.S. Application Data

(60) Provisional application No. 62/907,453, filed on Sep. 27, 2019.

(56) References Cited

U.S. PATENT DOCUMENTS

| | | | | |
|---|---|---|---|---|
| 3,393,605 | A | 7/1968 | Parnell | |
| 3,724,870 | A | 4/1973 | Kurokawa et al. | |
| 3,795,980 | A | 3/1974 | Batson | |
| 3,873,786 | A | 3/1975 | Lagofun | |
| 4,168,480 | A | 9/1979 | De Lucia | |
| 4,224,487 | A | 9/1980 | Simonsen | |
| 4,354,072 | A | 10/1982 | Noeske | |
| 5,583,729 | A | 12/1996 | Hassler et al. | |
| 5,783,987 | A | 7/1998 | Kern et al. | |
| 5,920,029 | A | 7/1999 | Teaford | |
| 6,136,114 | A | 10/2000 | Johnson et al. | |
| 6,194,988 | B1 | 2/2001 | Yamaguchi et al. | |
| 7,123,124 | B2 | 10/2006 | Caruso et al. | |
| 7,205,879 | B2 | 4/2007 | Kordel et al. | |
| 7,222,561 | B2 | 5/2007 | Brede et al. | |
| 7,511,600 | B2 | 3/2009 | Von Behr et al. | |
| 7,528,332 | B1 | 5/2009 | Via et al. | |
| 7,772,958 | B2 | 8/2010 | Schlotzer | |
| 8,164,868 | B2 | 4/2012 | Dommaschk et al. | |
| 8,446,241 | B2 | 5/2013 | Filiputti et al. | |
| 9,236,208 | B2 | 1/2016 | Ukon et al. | |
| 9,887,055 | B2 | 2/2018 | McTigue et al. | |
| 2004/0041682 | A1 | 3/2004 | Pasha et al. | |
| 2004/0112239 | A1 | 6/2004 | Parks et al. | |
| 2009/0127229 | A1 | 5/2009 | Schmitz et al. | |
| 2009/0141416 | A1 | 6/2009 | Dommaschk et al. | |
| 2010/0089739 | A1 | 4/2010 | Filiputti et al. | |
| 2010/0097166 | A1 | 4/2010 | Hasel et al. | |
| 2010/0218659 | A1 | 9/2010 | Ukon et al. | |
| 2013/0104680 | A1* | 5/2013 | Cabas | F03G 7/065 74/89.32 |
| 2013/0106543 | A1* | 5/2013 | Isozaki | H01H 9/443 335/201 |
| 2013/0126326 | A1 | 5/2013 | Borg | |
| 2014/0014194 | A1 | 1/2014 | Kim | |
| 2015/0206681 | A1 | 7/2015 | Marlin et al. | |
| 2016/0211087 | A1* | 7/2016 | Minke | H01H 3/02 |
| 2016/0356587 | A1* | 12/2016 | Perichon | F42C 15/40 |
| 2017/0229267 | A1 | 8/2017 | Lell | |
| 2017/0229268 | A1 | 8/2017 | Goldman et al. | |
| 2017/0236663 | A1 | 8/2017 | Jung | |
| 2017/0330714 | A1 | 11/2017 | von zur Muehlen et al. | |
| 2018/0166246 | A1 | 6/2018 | McTigue et al. | |
| 2019/0013168 | A1 | 1/2019 | Waag | |
| 2019/0108957 | A1 | 4/2019 | Volkmann et al. | |
| 2019/0184834 | A1* | 6/2019 | Hammerschmidt | H01H 39/00 |
| 2019/0198277 | A1 | 6/2019 | McTigue et al. | |
| 2019/0363532 | A1 | 11/2019 | von zur Muehlen et al. | |
| 2020/0279711 | A1 | 9/2020 | Alexandre | |
| 2021/0166901 | A1 | 6/2021 | Cacciatore et al. | |

FOREIGN PATENT DOCUMENTS

| | | | |
|---|---|---|---|
| CN | 104969322 | A | 10/2015 |
| CN | 109273328 | A | 1/2019 |
| DE | 241431 | | 3/1976 |
| DE | 102014007459 | A1 | 11/2015 |
| DE | 102017205833 | A1 | 10/2018 |
| DE | 102018133636 | A1 | 7/2019 |
| DE | 102018109842 | A1 | 10/2019 |
| EP | 0681352 | A2 | 11/1995 |
| FR | 2242766 | A1 | 3/1975 |

OTHER PUBLICATIONS

Chinese Office Action mailed May 6, 2023 for Chinese patent application No. 2020110347593, a counterpart foreign application of U.S. Pat. No. 11,443,910, 14 pages.

Translation of Korean Office Action mailed Jan. 16, 2023 for Korean Patent Application No. 10-2020-0125563, a foreign counterpart to U.S. Appl. No. 17/032,774, 9 pages.

Korean Office Action mailed Jul. 27, 2023 for Korean Patent Application No. 10-2020-0125563, a foreign counterpart to U.S. Pat. No. 11,443,910, 3 Pages.

Korean Office Action mailed Jan. 16, 2023 for Korean Patent Application No. 10-2020-0125563, a foreign counterpart to U.S. Appl. No. 17/032,774, 9 pages.

Chinese Office Action mailed Jan. 29, 2024 for Chinese Application No. 202011034759.3, a foreign counterpart to U.S. Pat. No. 11,443,910, 9 pages.

Examination Report under Section 18(3), dated Apr. 8, 2024, for GB Application No. 2015333.4, 6 pages.

* cited by examiner

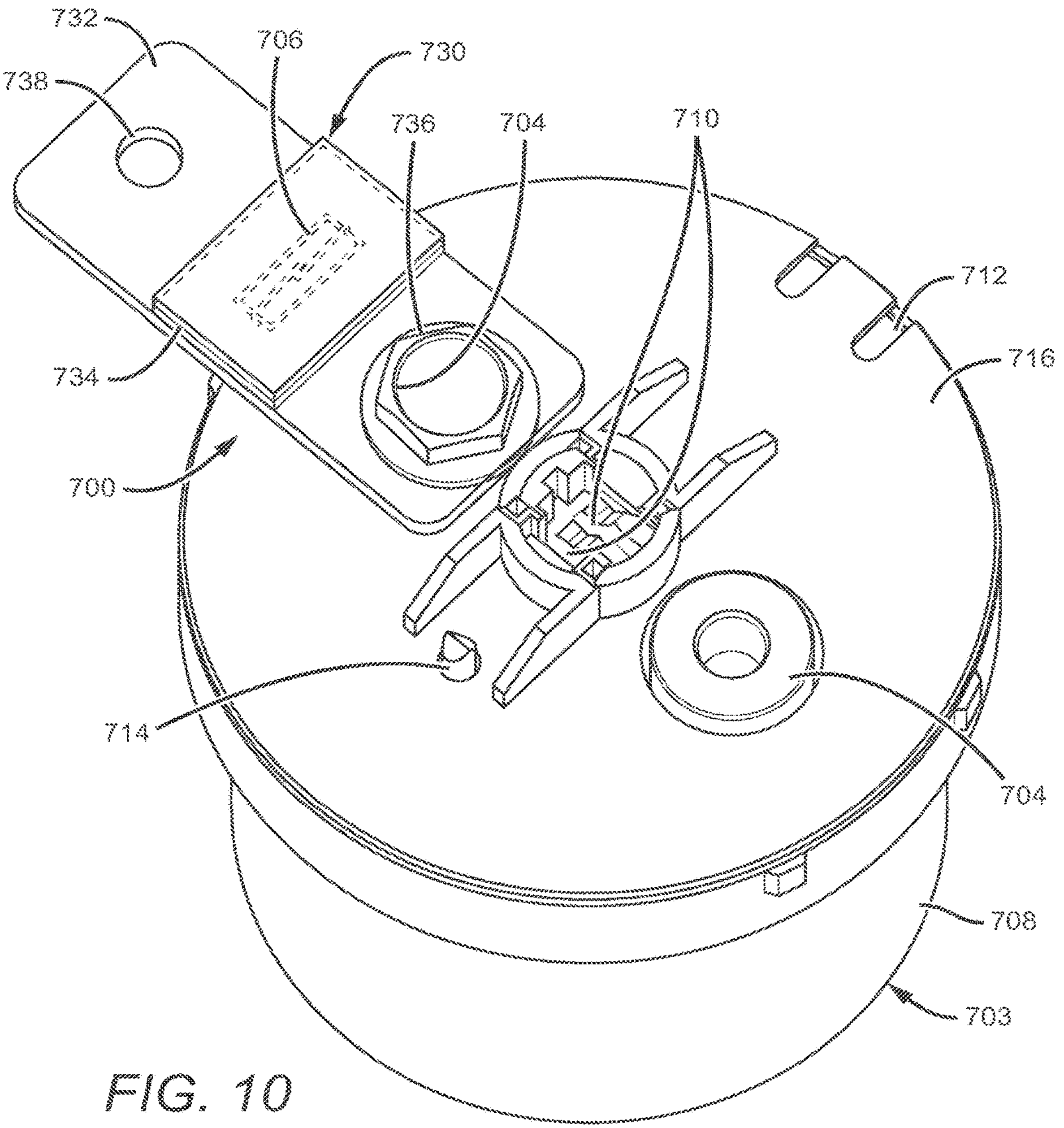
FIG. 10
FIG. 11
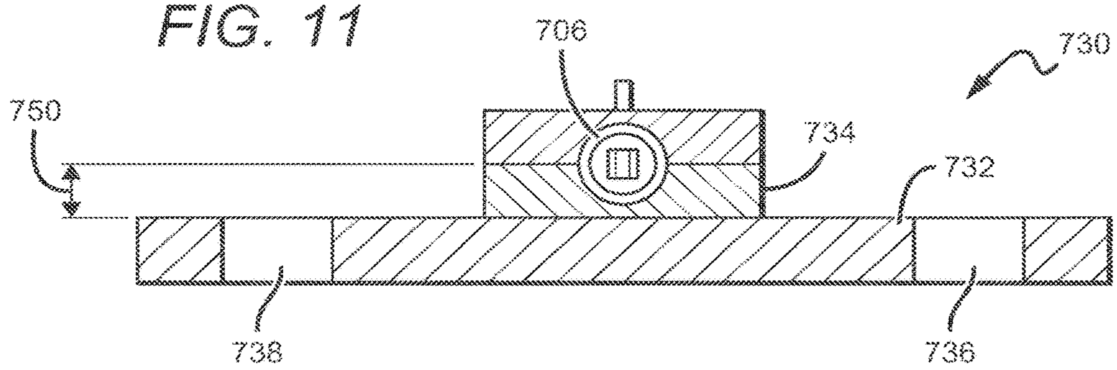

CONTACT LEVITATION TRIGGERING MECHANISMS FOR USE WITH SWITCHING DEVICES INCORPORATING PYROTECHNIC FEATURES

CROSS-REFERENCE TO RELATED APPLICATIONS

This is a continuation application that claims priority to commonly assigned, U.S. application Ser. No. 17/032,774, filed, Sep. 25, 2020, which claims priority to U.S. Provisional Patent Application No. 62/907,452, filed on Sep. 27, 2019, the entire disclosures of which are incorporated herein by reference.

BACKGROUND

Field of the Invention

Described herein are devices relating to triggering mechanisms and configurations for use with electrical switching devices, such as contactor devices and electrical fuse devices.

Description of the Related Art

Connecting and disconnecting electrical circuits is as old as electrical circuits themselves and is often utilized as a method of switching power to a connected electrical device between "on" and "off" states. An example of one device commonly utilized to connect and disconnect circuits is a contactor, which is electrically connected to one or more devices or power sources. A contactor is configured such that it can interrupt or complete a circuit to control electrical power to and from a device. One type of conventional contactor is a hermetically sealed contactor.

In addition to contactors, which serve the purpose of connecting and disconnecting electrical circuits during normal operation of a device, various additional devices can be employed in order to provide overcurrent protection. These devices can prevent short circuits, overloading, and permanent damage to an electrical system or a connected electrical device. These devices include disconnect devices which can quickly break the circuit in a permanent way such that the circuit will remain broken until the disconnect device is repaired, replaced, or reset. One such type of disconnect device is a fuse. A conventional fuse is a type of low resistance conductor that acts as a sacrificial device. Typical fuses comprise a metal wire or strip that melts when too much current flows through it, interrupting the circuit that it connects.

As society advances, various innovations to electrical systems and electronic devices are becoming increasingly common. An example of such innovations includes recent advances in electrical automobiles, which may one day become the energy-efficient standard and replace traditional petroleum-powered vehicles. In such expensive and routinely used electrical devices, overcurrent protection is particularly applicable to prevent device malfunction and prevent permanent damage to the devices. Furthermore, overcurrent protection can prevent safety hazards, such as electrical fires. These modern improvements to electrical systems and devices require modern solutions to increase convenience and efficiency of mechanisms for triggering fuse devices.

SUMMARY

Described herein are passive triggering features and configurations for the activation of pyrotechnic features to function as a fuse mechanism within switching devices, such as contactors or fuse devices. These passive triggering configurations can be configured to trigger in response to a threshold level of current flowing through the switching device corresponding to a dangerous overcurrent. The different embodiments of the present invention are arranged to activate the pyrotechnic fuse mechanism during contact levitation and corresponding arcing.

One embodiment of an electrical switching device according to the present invention comprises a housing with internal component with in the housing. The internal components comprise contacts configured to operate to change the state of the switching device from a closed state allowing current flow through the switching device to an open state which interrupts current flow through the switching device. A pyrotechnic feature is included that is configured to interact with the internal components to transition the switching device from the closed state to the open state when the pyrotechnic feature is activated. The pyrotechnic feature is configured to trigger in response to levitation between the contacts at elevated current signal flowing through the switching device.

Embodiments according to the present invention can be arranged with a pyrotechnic initiator that is coupled directly to the switching device's high voltage terminals. When high current levitation occurs between the fixed and movable contacts, resistance between the fixed and movable contacts increases rapidly. This results in the current at the terminals to be directed down the path of least resistance, i.e. to the pyrotechnic initiator.

These and other further features and advantages of the invention would be apparent to those skilled in the art from the following detailed description, taken together with the accompanying drawings, wherein like numerals designate corresponding parts in the figures, in which:

BRIEF DESCRIPTION OF THE DRAWINGS

FIG. 10 is a front, top, perspective view of yet another pyrotechnic triggering configuration incorporating features of the present invention;

FIG. 11 is front sectional view of a portion of the pyrotechnic triggering configuration of FIG. 10;

DETAILED DESCRIPTION

Figure 1:
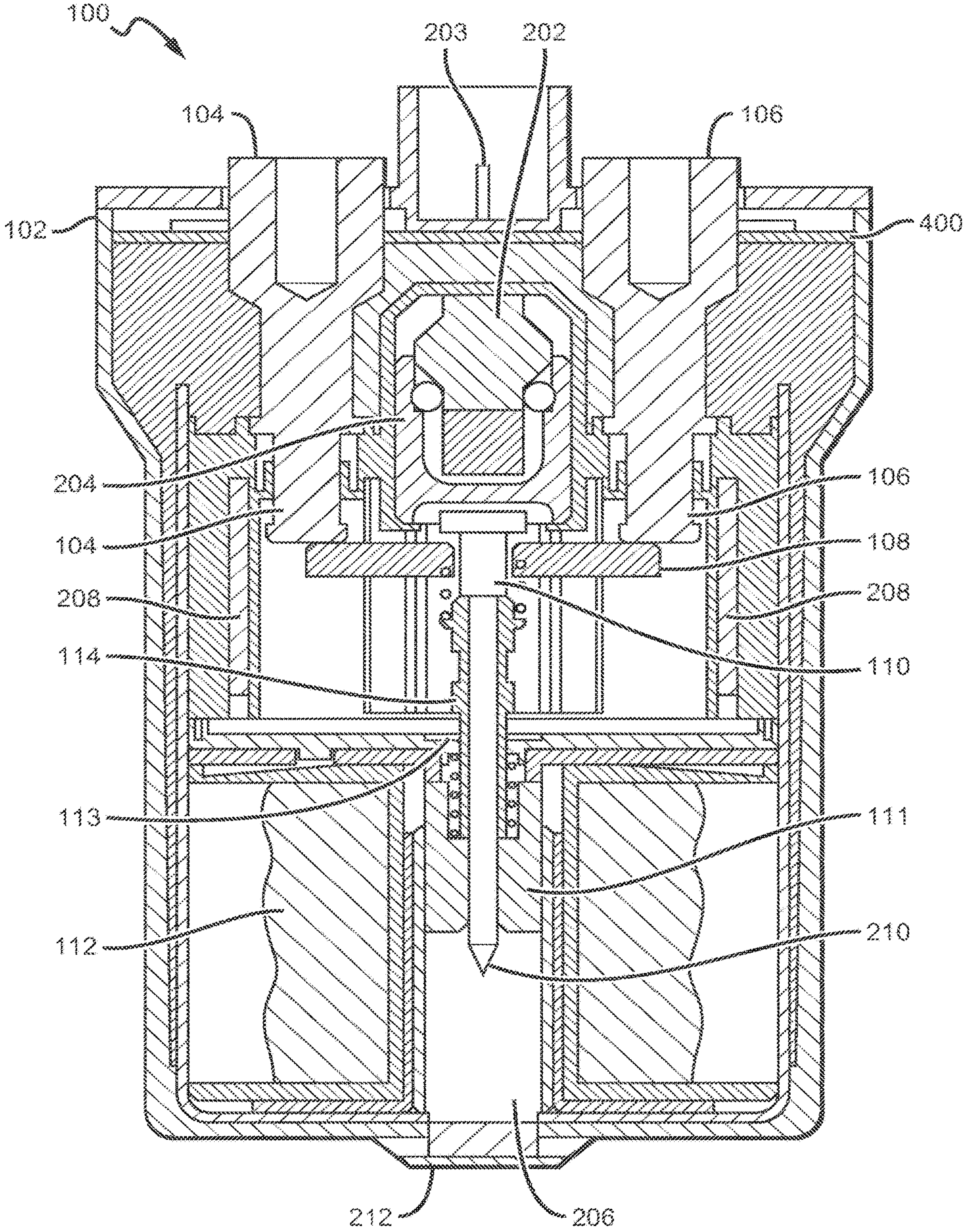
FIG. 1 is a front sectional view of an embodiment of a contactor able to incorporate features of the present invention, shown in the "closed" orientation that allows flow of electricity through the device.

The present disclosure will now set forth detailed descriptions of various embodiments. These embodiments set forth passive switching features and configurations for use with switching devices, such as contactors or fuse devices, integrating pyrotechnic circuit breaking features. These switching devices can be electrically connected to an electrical device or system to turn power to the connected device or system "on" or "off." While the example devices disclosed herein can utilize active triggering configurations in addition to, or in lieu of, the disclosed passive features, the passive features provide the advantage of automatically triggering a pyrotechnic circuit break in response to a threshold current level.

In some embodiments, the switching devices according to the present invention comprise an internal pyrotechnic charge coupled to a pyrotechnic activation or triggering mechanism. The pyrotechnic triggering mechanism can be coupled directly to the switching device's high voltage (fixed) contacts using known electrical coupling mechanisms. The pyrotechnic charge is configured to function as a fuse, permanently breaking the circuit through the contactor or fuse device, for example, by moving moveable contacts out of contact with fixed contacts.

As described in detail below, the closing force between the fixed and movable contacts of the contactor can be overcome by a repulsive levitation force. This levitation force is generated by the current flowing through the contacts and can cause separation of the fixed and movable contacts during elevated current flow. When this separation begins, arcing can occur between the fixed and movable contacts. This arcing in turn causes a rapid increase of resistance between the fixed and movable contacts. The elevated current at the terminals then takes a path of least resistance to the pyrotechnic triggering device, which causes activation of the pyrotechnic charge. This in turn can cause permanent separation of the fixed and movable contacts.

It is understood that the levitation arcing activated pyrotechnic actuator can be used in conjunction with other passive and active pyrotechnic activation circuits. In these embodiments, the switching devices can be arranged with a single pyrotechnic activation or triggering mechanism, that can be activated from different sources or circuits that activate a single pyrotechnic charge. Alternatively, multiple pyrotechnic triggering mechanisms can be included, each of which activates its own pyrotechnic charge.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent to the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

It is understood that when a first element is referred to as being "between," "sandwiched," or "sandwiched between," two or more other elements, the first element can be directly between the two or more other elements or intervening elements may also be present between the two or more other elements. For example, if a first element is "between" or "sandwiched between" a second and third element, the first element can be directly between the second and third elements with no intervening elements or the first element can be adjacent to one or more additional elements with the first element and these additional elements all between the second and third elements.

Before describing specific pyrotechnic triggering configurations incorporating features of the present invention in detail, example switching devices incorporating pyrotechnic features and providing example environments for passive triggering configurations according to the present disclosure will first be described. These switching devices can include any switching devices incorporating pyrotechnic features, for example, contactors configured to allow switching of a device between an "on" and "off" state.

In some contactor devices, the pyrotechnic features function as a fuse element incorporated into the contactor device. Examples of such contactor devices are set forth in U.S. application Ser. No. 16/101,143, entitled Contactor Device Integrating Pyrotechnic Disconnect Features, which is assigned to Gigavac, Inc., the assignee of the present application and which is incorporated by reference into the present application. In addition to contactors configured to freely switch between "on" and "off" states, pyrotechnic triggering configurations according to the present disclosure can also be utilized with sacrificial fuse devices that are configured to allow current through an electrical system or device when not triggered, and to prevent current through the electrical system or device when triggered. Examples of such fuse devices are set forth in U.S. application Ser. No. 15/889,516, entitled MECHANICAL FUSE DEVICE, which is assigned to Gigavac, Inc., the assignee of the present application and which is incorporated by reference into the present application.

In reference to an example contactor device incorporating pyrotechnic features, FIG. 1 shows a sectional view of an example embodiment of a contactor device 100, which comprises an integrated pyrotechnic disconnect component which can function as a sacrificial disconnect in the event of overcurrent. FIG. 1 shows the contactor device 100 in a "closed" circuit position, wherein flow of electricity through the contactor device is enabled. FIG. 1 further shows the pyrotechnic disconnect portion of the contactor device 100 in its non-triggered or "set" mechanical orientation, allowing the contactor device to function normally to operate between its "closed" and "open" position. The disconnect portion of the contactor device 100 also has a "triggered" orientation, where the circuit is broken and the flow of electricity through the contactor device is permanently disabled until the device is replaced or repaired and reset. Both the "closed" and "open" contactor modes and the "set" and "triggered" disconnect modes are described in more detail further herein.

The contactor device 100 of FIG. 1 comprises a body 102 (also referred to as a housing 102), and two or more fixed contact structures 104, 106 (two shown) which are configured to electrically connect the internal components of the contactor device to external circuitry, for example, to an electrical system or device. The body 102 can comprise any suitable material that can support the structure and function of the contactor device 100 as disclosed herein, with a preferred material being a sturdy material that can provide structural support to the contactor device 100 without interfering with the electrical flow through the fixed contacts 104, 106 and the internal components of the device. In some embodiments, the body 102 comprises a durable plastic or polymer. The body 102 at least partially surrounds the various internal components of the contactor device 100, which are described in more detail further herein.

The body 102 can comprise any shape suitable for housing the various internal components including any regular or irregular polygon. The body 102 can be a continuous structure, or can comprise multiple component parts joined together, for example, comprising a base body "cup," and a top "header" portion sealed with an epoxy material. Some example body configurations include those set forth in U.S. Pat. Nos. 7,321,281, 7,944,333, 8,446,240 and 9,013,254, all of which are assigned to Gigavac, Inc., the assignee of the present application, and all of which are hereby incorporated in their entirety by reference.

The fixed contacts 104, 106 are configured such that the various internal components of the contactor device 100 that are housed within the body 102 can electrically communicate with an external electrical system or device, such that the contactor device 100 can function as a switch to break or complete an electrical circuit as described herein. The fixed contacts 104, 106 can comprise any suitable conductive material for providing electrical contact to the internal components of the contactor device, for example, various metals and metallic materials or any electrical contact material or structure that is known in the art. The fixed contacts 104, 106 can comprise single continuous contact structures (as shown) or can comprise multiple electrically connected structures. For example, in some embodiments, the fixed contacts 104, 106 can comprise two portions, a first portion extending from the body 102, which is electrically connected to a second portion internal to the body 102 that is configured to interact with other components internal to the body as described herein.

The body 102 can be configured such that the internal space of the body 102, which houses the various internal components of the contactor device 100, is hermetically sealed. When coupled with the use of electronegative gas, this hermetically sealed configuration can help mitigate or prevent electrical arcing between adjacent conductive elements, and in some embodiments, helps provide electrical isolation between spatially separated contacts. In some embodiments, the body 102 can be under vacuum conditions. The body 102 can be hermetically sealed utilizing any known means of generating hermetically sealed electrical devices. Some examples of hermetically sealed devices include those set forth in U.S. Pat. Nos. 7,321,281, 7,944,333, 8,446,240 and 9,013,254, all of which are assigned to Gigavac, Inc., the assignee of the present application, and all of which are incorporated into the present application in their entirety by reference.

In some embodiments, the body 102 can be at least partially filled with an electronegative gas, for example, sulfur hexafluoride or mixture of nitrogen and sulfur hexafluoride. In some embodiments, the body 102 comprises a material having low or substantially no permeability to a gas injected into the housing. In some embodiments, the body can comprise various gasses, liquids or solids configured to increase performance of the device.

Before describing the pyrotechnic disconnect components of the contactor device 100 used for overcurrent protection, the contactor components utilized during ordinary switching use of the contactor device 100 will be described first. When not interacting with any of the other components internal to the body 102, the fixed contacts 104, 106 are otherwise electrically isolated from one another such that electricity cannot freely flow between them. The fixed contacts 104, 106 can be electrically isolated from one another through any known structure or method of electrical isolation.

When the contactor device 100 is in its "closed" position, as shown in FIG. 1, both of the otherwise electrically isolated fixed contacts 104, 106 are contacted by a moveable contact 108. The moveable contact 108 functions as a bridge allowing an electrical signal to flow through the device, for example, from the first fixed contact 104, to the moveable contact 108, to the second contact 106 or vice versa. Therefore, the contactor device 100 can be connected to an electrical circuit, system or device and complete a circuit while the moveable contact is in electrical contact with the fixed contacts.

The moveable contact 108 can comprise any suitable conductive material including any of the materials discussed herein in regard to the fixed contacts 104, 106. Like with the fixed contacts 104, 106, the moveable contact 108 can comprise a single continuous structure (as shown), or can comprise multiple component parts electrically connected to one another so as to serve as a contact bridge between the otherwise electrically isolated fixed contacts 104, 106, so that electricity can flow through the contactor device 100.

The moveable contact 108 can be configured such that it can move into and out of electrical contact with the fixed contacts 104, 106. This causes the circuit to be "closed" or completed when the moveable contact is in electrical contact with the fixed contacts 104, 106, and to be "open" or broken when the moveable contact 108 is not in electrical contact with the fixed contacts 104, 106. The fixed contacts 104, 106 are otherwise electrically isolated from one another when not contacting the moveable contact 108. In some embodiments, including the embodiment shown in FIG. 1, the moveable contact 108 is physically connected to a shaft structure 110, which is configured to move along a predetermined distance within the contactor device 100. The shaft 110 can comprise any material or shape suitable for its function as an internal moveable component that is physically connected to the moveable contact 108, such that the moveable contact 108 can move with the shaft 110.

Movement of the shaft 110 controls movement of the moveable contact 108, which in turn controls the position of the moveable contact 108 in relation to the fixed contacts 104, 106, which in turn controls flow of electricity through the contactor device 100 as described herein. Movement of the shaft can be controlled through various configurations, including, but not limited to, electrical and electronic, magnetic and solenoid, and manual. Example manual configurations for controlling a shaft connected to a moveable contact are set forth in U.S. Pat. No. 9,013,254, to Gigavac, Inc., the assignee of the present application, and all of which is incorporated into the present application in its entirety by reference. Some of these example configurations of manual control features include magnetic configurations, diaphragm configurations and bellowed configurations.

In the embodiment shown in FIG. 1, movement of the shaft 110 is controlled through the use of a solenoid configuration. A plunger structure 111 is connected to, or at least partially surrounds, a portion of the shaft 110. The body 102 also houses a solenoid 112. Many different solenoids can be used, with one example of a suitable solenoid being a solenoid operating under a low voltage and with a relatively high force. One example of a suitable solenoid is commercially available solenoid Model No. SD1564 N1200, from Bicron Inc., although many other solenoids can be used. In the embodiment shown, the plunger structure 111 can comprise a metallic material that can be moved and controlled by the solenoid 112. Movement of the plunger structure 111 controls movement of the connected shaft 110, which in turn controls movement of the connected moveable contact 108.

The travel distance of the shaft 110 can be controlled utilizing various features, for example, springs to control travel/overtravel distance or various portions of the body 102 that can block or restrict the travel distance of the shaft 110. In the embodiment shown in FIG. 1, the travel distance of the shaft 110 is partially controlled by a hard stop 113, which is configured to abut against a winged portion 114 of the shaft 110, to limit the distance of the shaft 110 when the shaft 110 has traveled a sufficient distance from the fixed contacts 104, 106. The hard stop 113 can comprise any material or shape suitable for providing a surface to interact with the shaft 110 in order to limit the movement or travel distance of the shaft 110. In the embodiment shown in FIG. 1, the hard stop 113 comprises a plastic material. In some embodiments, the hard stop 113 is configured to break or shear off when the pyrotechnic disconnect elements are triggered, as will be discussed in more detail further below.

Now that the basic switching features of the contactor device 110 have been set forth, the pyrotechnic disconnect elements will now be described. The contactor device 100 can comprise several elements that can function as overcurrent protection, including a pyrotechnic charge 202 and a piston structure 204. The piston structure 204 can be positioned near or at least partially around one or more of the internal components, for example, the shaft 110 as shown. Movement of the piston from a resting position can change the configuration of the internal components to interrupt flow of electricity through the device, for example, by pushing against or otherwise moving the shaft 100 as described herein. The pyrotechnic charge 202 can be configured such that it is activated when current exceeds a predetermined threshold level, in order to prevent permanent damage to a connected electric device or a safety hazard such as an electrical fire.

The contactor device 100 can comprise various sensor features that can detect when current through the device has reached a dangerous level and can trigger the pyrotechnic charge when this threshold level has been detected. In some embodiments, the contactor device 100 can comprise a dedicated current sensor configured to detect the level of current flowing through the device. The current sensor can be configured to directly or indirectly activate the pyrotechnic charge when the current has reached a threshold level. In some embodiments, the current sensors can transmit a signal proportional to the detected current to activate the pyrotechnic charge when a threshold current level is detected. In some embodiments, the current sensors can comprise a Hall effect sensor, a transformer or current clamp meter, a resistor, a fiber optic current sensor, or an interferometer.

In some embodiments, the pyrotechnic charge 202 is configured to be activated by electrical pulse and is driven by an airbag system configured to detect multiple factors, similar to that utilized in modern vehicles. In some embodiments, the contactor device 100 can comprise one or more pyrotechnic pins 203 that can be configured to trigger the pyrotechnic charge 202 when the pyrotechnic pins 203 receive an activation signal. In some embodiments, the pyrotechnic charge can be connected to another feature that already monitors the flowing current. This other feature, for example, a battery management component, can then be configured to send a signal to activate the pyrotechnic charge when a threshold current level is detected.

The pyrotechnic charge 202 can be a single charge structure or a multiple charge structure. In some embodiments, the pyrotechnic charge 202 comprises a double charge structure comprising first an initiator charge and then a secondary gas generator charge. Many different types of pyrotechnic charges can be utilized provided the pyrotechnic charge used is sufficient to provide sufficient force to move the piston structure 204 to permanently break the circuit of the contactor device 100 as described herein. In some embodiments, the pyrotechnic charge 202 comprises zirconium potassium perchlorate, which has the advantage of being suitable for use as both an initiator charge and a gas generator charge. In some embodiments, the initiator charge comprises a fast-burning material such as zirconium potassium perchlorate, zirconium tungsten potassium perchlorate, titanium potassium perchlorate, zirconium hydride potassium perchlorate, or titanium hydride potassium perchlorate. In some embodiments, the gas generator charge comprises a slow-burning material such as boron potassium nitrate, or black powder.

When the pyrotechnic charge 202 is activated, the resulting force causes the piston structure 204 to be driven away from its resting position near or around the pyrotechnic charge 202, which in turn causes the piston structure 204 to push against the shaft 110 and cause the shaft to be driven away from the fixed contacts 104, 106. The resulting force is also sufficient to break or shear off the hard stop 113, causing the shaft 110 to be forced even further away from the fixed contacts 104, 106, for example, being pushed into a separate internal compartment 206 of the body 102. The piston structure 204 can comprise sufficient dimensions (e.g. shape, size, spatial orientation or other configuration) such that the piston structure 204 can hold the internal components in a position or configuration wherein electricity cannot flow through the contactor device. This is done, for example, by holding the shaft 110 in place further away from the fixed contacts 104, 106, such as, by holding the shaft 110 such that it is substantially within the separate internal compartment 206 of the body 102. This in turn causes the moveable contact 108, which is connected to the shaft 110, to be separated by an even larger spatial gap from the fixed contacts 104, 106, causing the device to be in the "triggered" or permanent "open" configuration wherein electricity cannot flow through the device. In some embodiments, the piston structure 204 comprises sufficient dimensions such that once it is displaced by activation of the pyrotechnic features 202, the piston structure 204 is forced into a position where it interacts with a portion of the body 102, such that it cannot easily be moved.

In addition to the rapidly created large spatial gap between the fixed contacts 104, 106 and the moveable contact 108, additional structures can be utilized. For example, in some embodiments, one or more arc blowout magnets 208 (two shown) can be utilized to further control electrical arcing. While the main method for interrupting current flow is to rapidly open the contacts to a much larger air gap as described herein, there can also be additional performance gained through a secondary gas blast directed at the arc, for example, through use of a gas generator charge.

In some embodiments, including the embodiment shown in FIG. 1, other optional design features can be included, which can help prevent hazards caused by the rapid buildup of gas resulting from the activation of the pyrotechnic charge 202. In these embodiments, the body 102 can be configured such that when the pyrotechnic charge 202 is activated, the piston structure 204 drives the shaft 110 with sufficient force to puncture a portion of the body 102. This will allow the rapid buildup of gas to escape. This is achieved, in some embodiments, by a portion of the body 102 comprising a membrane that can be punctured during the pyrotechnic disconnect cycle, for example, by a sharp portion 210 of the shaft 110, allowing gas to escape from a connected vent portion 212 of the body 102, which can be a high temperature filter membrane. The high temperature gas can then pass out of the body 102. The pressure release may cool the electrical arc and improve performance as well as prevent the contactor housing from rupturing.

Figure 2:
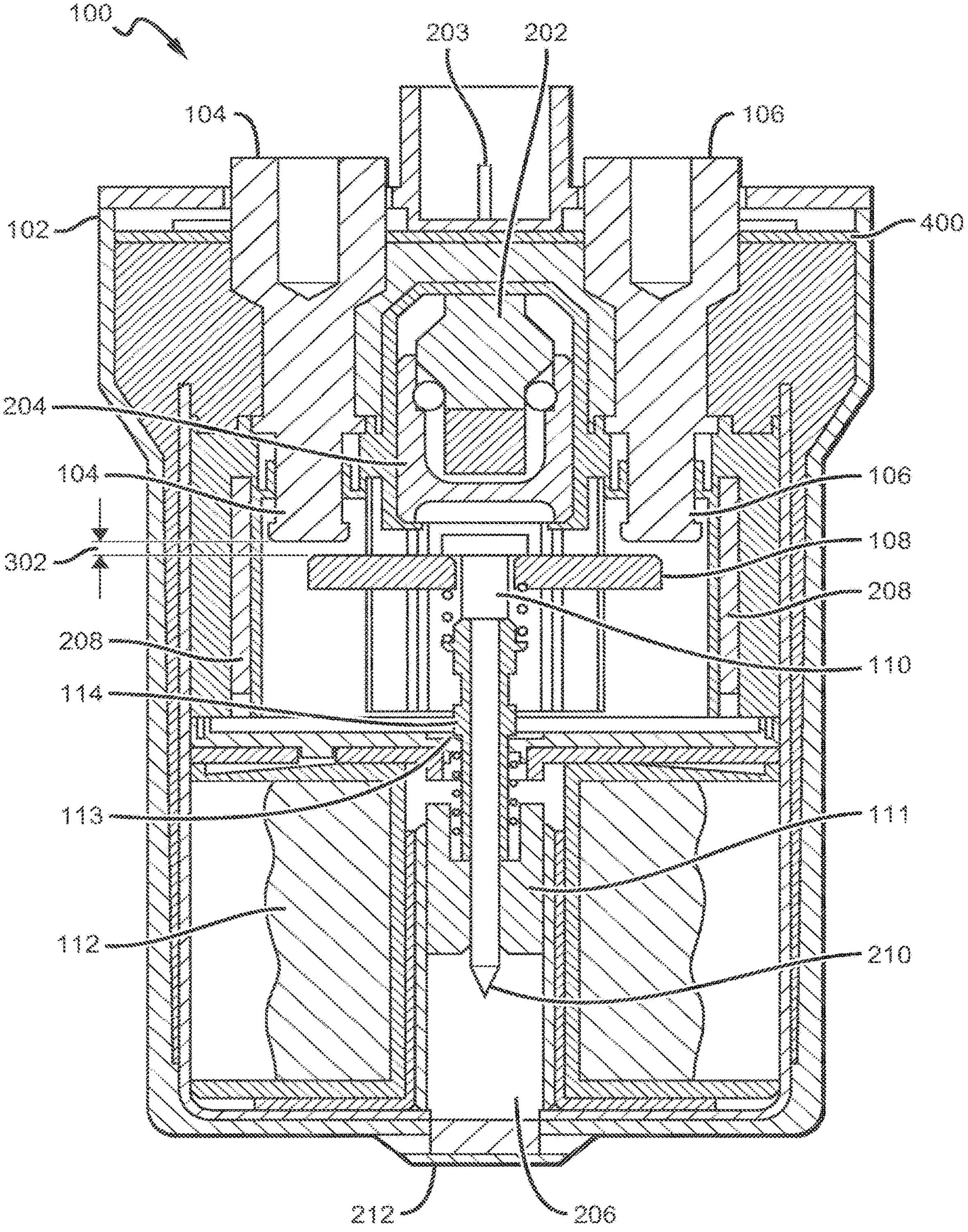
FIG. 2 is a front sectional view of the embodiment of the contactor device of FIG. 1, shown in an "open" or "disconnected" orientation that prevents flow of electricity through the device.
Figure 3:
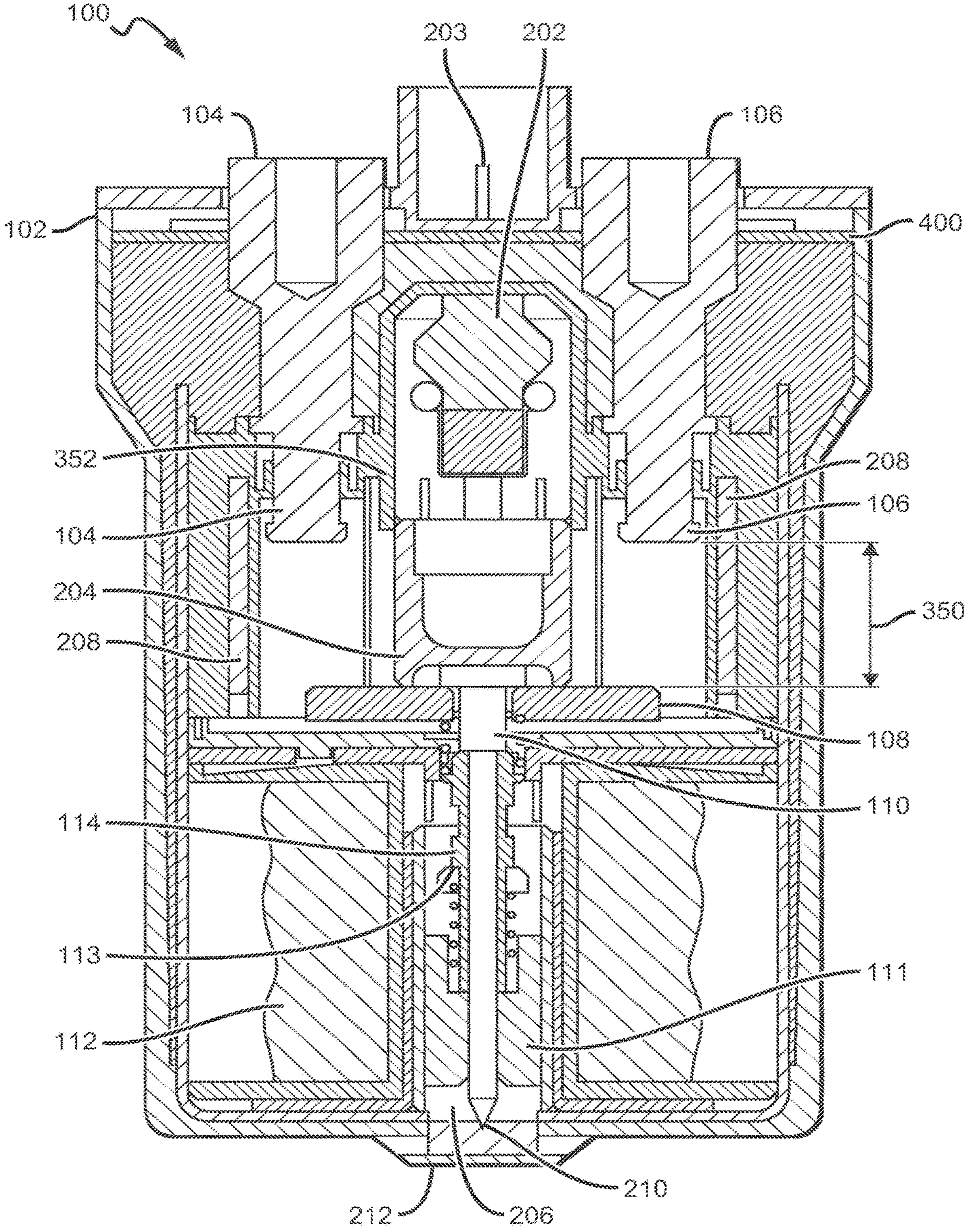
FIG. 3 is a front sectional view of the embodiment of the contactor device of FIG. 1, shown in a different orientation, wherein the disconnect elements have been "triggered;"

The differences between breaking the circuit of electrical flow through the contactor device 100 during normal switching operation and the permanent breaking of the circuit of electrical flow through the contactor device 100 when the device is in its "triggered" state is better illustrated in FIGS. 2-3. FIGS. 2-3 show the contactor device 100 of FIG. 1, but in different orientations. The contactor device 100 comprises a body 102, fixed contacts 104, 106, moveable contact 108, shaft 110, plunger structure 111, solenoid 112, hard stop 113, winged portion 114 of the shaft 110, pyrotechnic charge 202, pyro pins 203, piston structure 204, separate compartment 206 of the body 102, arc blowout magnets 208, sharp portion 210 of the shaft 110, and vent portion 212 of the body 102.

The contactor device 100 is shown in its "open" state in FIG. 2, which shows the shaft 110 moved such that the connected moveable contact 108 is separated from the fixed contacts 104, 106 by a disconnection spatial gap 302. The contactor device 100, as shown in FIG. 2, is still in the "set" position without the pyrotechnic features being activated. The disconnection spatial gap 302 causes the moveable contact 108 to be spaced a sufficient distance from the fixed contacts 104, 106, which are otherwise electrically isolated from one another, to interrupt flow of electricity through the device. In contrast, FIG. 3 shows the contactor device 100 in its triggered stated when the pyrotechnic charge 202 has been activated, causing the piston structure 204 to force the shaft 110 and moveable contact 108, in a direction further away from the fixed contacts 104, 106. This rapidly creates a larger circuit break spatial gap 350 between the fixed contacts 104, 106 and the moveable contact 108.

The resulting force from the activation of the pyrotechnic charge 202, and the resulting sudden movement of the piston structure 204 and the shaft 110, is sufficient to break or shear off the hard stop 113, which is shown in FIG. 3 to be displaced from its original position connected to the body 113. The hard stop 113 can comprise a sturdy material that is connected or integrated with the body 102, such that it functions as a stop for the shaft 110 during normal device operation between "closed" and "open" circuit states. However, during operation of the pyrotechnic disconnect features, the hard stop 113 can be intentionally designed to "fail" as a stop structure and break or shear off to allow the shaft 110 to proceed into the separate body compartment 206.

In some embodiments, the piston structure 204 can be configured such that it can interact with a piston-stop portion 352 of the body 102 after the pyrotechnic charge 202 has been activated. This can be done, for example, by interacting with a position of the piston structure 204, for example, a portion of the piston-stop portion 352 configured to interact or mate with another portion on the piston structure 204.

In some embodiments, the piston structure 204 will not be in a position to come into contact with the piston-stop portion 352 until after the piston structure 204 has been displaced by activation of the pyrotechnic charge 202. This causes the piston structure 204 to be held between the piston-stop portion 352 and the moveable contact 108, when the pyrotechnic charge 202 has been activated and the piston structure 204 has been forced from its resting position. As shown in FIG. 3, this configuration places the piston structure 204 in a position, which holds or locks the piston structure 204 against the moveable contact 108. The piston structure 204 holds the moveable contact 108 in place and helps maintain the circuit break spatial gap 350 such that the fixed contacts 104, 106 and the moveable contact 108 cannot slip back into contact with each other, rendering the contactor device 100 nonoperational.

In some embodiments, in lieu of or in addition to the piston-stop portion 352 of the body 102, the separate compartment 206 of the body 102, can comprise sufficient dimensions including, for example, size and shape, such that the separate compartment 206 can interact with a portion of the shaft 110 that has moved into the separate compartment 206 due to activation of the pyrotechnic charge 202.

In some embodiments, the separate compartment can be configured to interact with the sheared off hard stop 113 or another structure connected to the shaft 110 that has moved into the separate compartment 206 due to activation of the pyrotechnic charge 202. These portions of the shaft 110, or connected structures, were not previously within the separate compartment 206 during ordinary device operation, but are forced into the separate compartment 206 during the pyrotechnic cycle during overcurrent protection operation. The separate compartment 206 comprise a sufficient size, shape or additional features, for example, features configured to interact or mate with corresponding features on the shaft 110 or connected structure, to hold the shaft 110 in place so the moveable contact 108 connected to the shaft 110 cannot slip back into contact with the fixed contacts 104, 106.

In addition to the foregoing features, the contactor device 100 of FIGS. 1-3 can further comprise a PCB 400. As will be discussed further herein, the PCB allows for efficient and convenient connection of the internal components of the contactor device 100 to pyrotechnic triggering configurations incorporating features of the present invention. The PCB 400 can be a PCB designed to accommodate pyrotechnic trigging configurations incorporating features of the present invention. In the embodiment shown in FIGS. 1-3, the PCB 400 is shown located near the top portion of the contactor device 100; however, it is understood that the PCB 400 can be located in or on any portion of the contactor device 100 and can be internal to the contactor device 100 or external to the contactor device 100.

Figure 4:
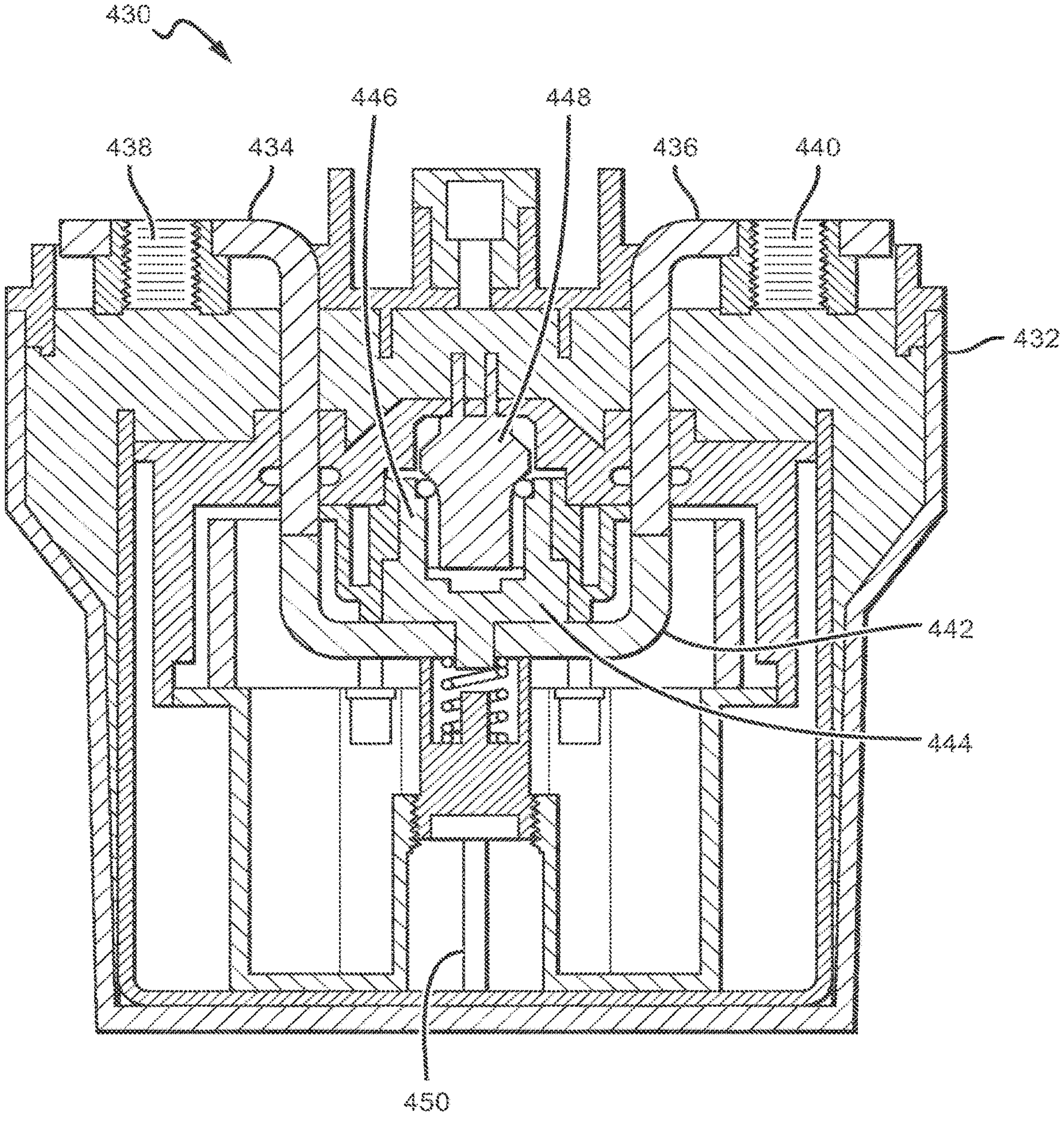
FIG. 4 is a front sectional view of a fuse device able to incorporate features of the present invention, shown in the resting "un-triggered" state.
Figure 5:
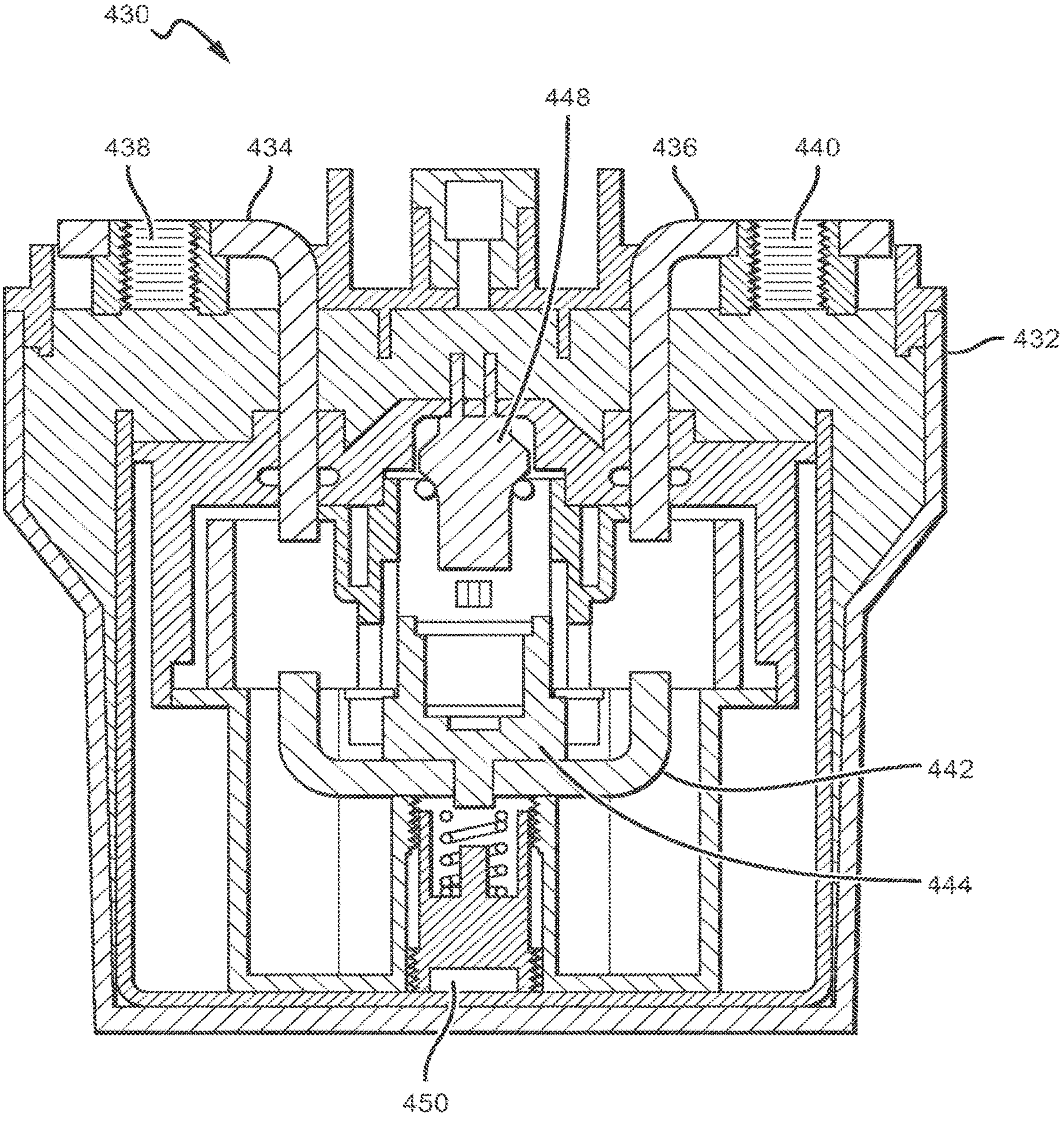
FIG. 5 is a front sectional view of a fuse device able to incorporate features of the present invention, shown in the activated "triggered" state.

Aside from contactor devices, which can operate to restrict or allow electrical flow through the device during ordinary operation, another type of switching device that can serve as an example environment for use with the passive pyrotechnic triggering configurations are fuse devices. Fuse devices only allow electrical flow through the device during ordinary operation and function as a sacrificial circuit break when a threshold current level passes through the device. FIGS. 4-5 show such an example fuse device 430, which comprises similar features, and operates similarly to the contactor device 100, in FIGS. 1-3, however, without comprising some of the features, such as a solenoid or other mechanism for opening and closing the fixed and moveable contacts. During ordinary operation, the fuse device 430 is constantly in a "closed" state allowing current flow through the device, until the pyrotechnic features are activated, resulting in the device being in an "open" state thereafter, preventing current flow through the device. FIGS. 4-5 show a body 432 (similar to the body 102 in FIGS. 1-3 above), fixed contacts 434, 436 (similar to fixed contacts 104, 106 in FIGS. 1-3 above). However, in this embodiment, the fixed contacts 434, 436 are formed separately from the power terminals 438, 440, which are electrically connected to the fixed contacts 434, 436 for connection to external circuitry, the power terminals and fixed contacts being one-in-the-same in the embodiment of FIGS. 1-3. FIGS. 4-5 further show moveable contacts 442 (similar to moveable contact 108 in FIGS. 1-3 above), a shaft structure 444 (similar to the shaft structure 110 in FIGS. 1-3 above, except shaped differently).

The shaft structure 444 is connected to the moveable contact 442 and the piston structure 446 (which is similar to the piston structure 204 in FIGS. 1-3 above). The piston structure 446 can at least partially surround a pyrotechnic charge 448, such that when the pyrotechnic charge 448 is activated the moveable contact 442 and the piston structure 446 are forced in a direction away from the fixed contacts 434, 436, therefore breaking the circuits. In some embodiments, the fuse device 430 can comprise a support structure 450 configured to help hold the fixed contacts 434, 436 and the moveable contacts 442 in place. In some embodiments, triggering of the pyrotechnic charge 448 causes the piston structure 446 to be driven away from the pyrotechnic charge with such force that the support structure 450 is broken or displaced. In some embodiments, the fuse device 430 can be triggered by active signals. In some embodiments, the fuse device 430 can be triggered by passive triggering configurations, such as those discussed herein. FIG. 4 shows the fuse device 430 in its "closed" state, wherein the fixed contacts 434, 436 and the moveable contacts 442 are together and electrical flow through the device 430 is permitted. In contrast, FIG. 5 shows the fuse device 430 in its "open" state after triggering of the pyrotechnic charge 448, wherein the fixed contacts 434, 436 and the moveable contacts 444 are separated and electrical flow through the device 430 is prevented.

As two types of switching devices, contactors and fuse devices, have been described as example environments that can utilize pyrotechnic triggering mechanisms according to the present disclosure, embodiments of pyrotechnic triggering mechanisms can now be more fully described. In the following embodiments described with regard to FIGS. 6-11, the pyrotechnic triggering configurations will be described with reference to being applied to the contactor device of FIGS. 1-3. However, it is understood that the pyrotechnic triggering configurations described with regard to FIGS. 6-11 can be applied as triggering devices in any switching mechanism incorporating pyrotechnic features including, for example, the fuse device described with regard to FIGS. 4-5.

Figure 6:
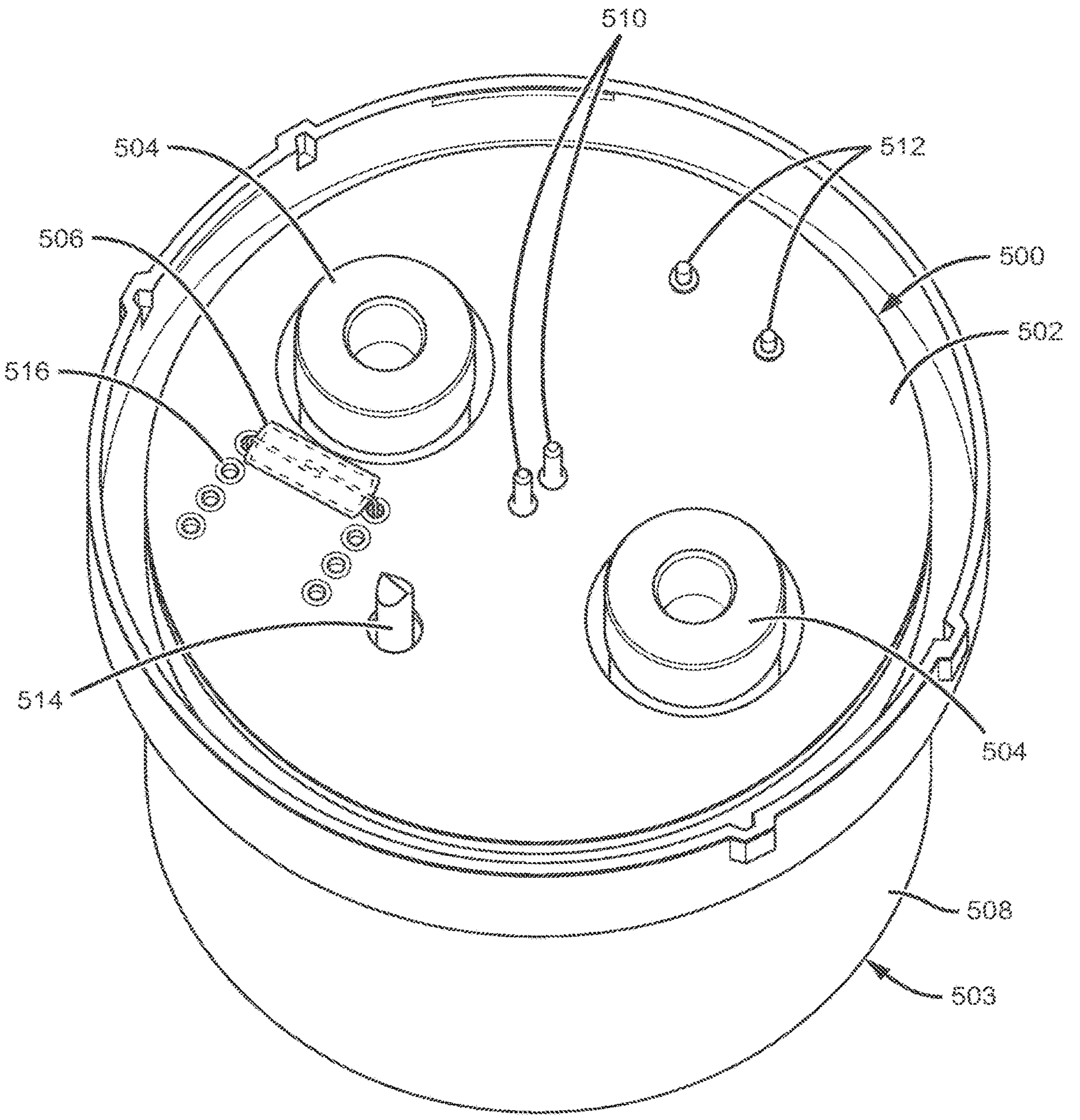
FIG. 6 is a front, top, perspective view of a pyrotechnic triggering configuration incorporating features of the present invention.

FIG. 6 shows a pyrotechnic triggering configuration 500 comprising a PCB 502 (traces not shown), similar to PCB 400 in FIGS. 1-3, electrical power terminals 504, similar to the fixed contact structures 104, 106 in FIGS. 1-3, and a passive trigger switch 506. FIG. 6 further shows the pyrotechnic triggering configuration 500 integrated with an electrical device 503, comprising a body 508, which can be similar to the body 102, containing internal components therein. The pyrotechnic triggering configuration 500 in FIG. 6 is shown without a top "cap" portion of the body so that the PCB 502 is viewable and exposed, however, it is understood that in normal device operation, features such as a closed body including a cap and epoxy material can be included. FIG. 6 also shows pyrotechnic pins 510 that are similar to pyrotechnic pins 203 in FIGS. 1-3. Coil pins 512 are included which allow for electrical connection to an internal coil or solenoid, for example, similar to solenoid 112 in FIGS. 1-3. A tubulation structure 514 is also included which can facilitate formation of an internal hermetic seal or management of electronegative gases within the electrical device 503.

In operation of the pyrotechnic triggering configuration 500 of FIG. 6, when a pre-determined level of current passes through the device 503, for example, a level of current denoting a dangerous level of current that can result in permanent damage to a device or creation of a hazard such as a fire, the passive trigger switch 506 will activate. This in turn completes a circuit to transmit a signal to the pyrotechnic pins 510, thereby activating an internal pyrotechnic element, for example, such as pyrotechnic charge 202 in FIGS. 1-3. In these embodiments, the PCB 502 can be configured such that it directs a triggering signal to the pyrotechnic pins 510, which are in electrical communication with pyrotechnic features internal to the device 503. The electrical pathway for this triggering signal can be dependent on closing or activating the passive trigger switch 506, such that when the passive trigger switch 506 is open or un-triggered (in a resting state) the electrical pathway for the triggering signal to the pyrotechnic pins 510 is obstructed. Likewise, when the passive trigger switch 506 is closed or activated, the triggering signal can be directed toward the pyrotechnic pins 510 and trigger the internal pyrotechnic feature.

The passive trigger switch 506 can be connected to a sensor that is configured to detect when a predetermined level of current passes through the device 503, the sensor signals the passive trigger switch 506 to trigger. In some embodiments, it is the passive trigger switch 506 itself that is configured detect or passively respond and trigger when the current flowing through the device 503 reaches a pre-determined level. For example, in some embodiments, the passive trigger switch 506 comprises a switch configured to react to a magnetic field generated by current flowing through the electrical power terminals 504 of the device 503 or from the flow of current through a region of the device 503.

In some embodiments, the passive trigger switch 506 is a reed switch or other switching mechanism configured to activate in response to the generation of a magnetic field of sufficient strength. Different configurations can be utilized with a reed switch. For example, the reed switch can be configured such that the contacts are open when resting, closing when a sufficient magnetic field is present, or closed when resting, opening when a sufficient magnetic field is present. Furthermore, in some embodiments, the reed switch can be organized into a reed relay and be actuated by a magnetic coil. In most embodiments incorporating a reed switch herein, the reed switch is configured such that the contacts are open when resting, preventing an electrical signal from traveling to the pyrotechnic pins 510 and activating the pyrotechnic features until a sufficient magnetic field corresponding to a dangerous current level closes the reed switch.

Figure 7:
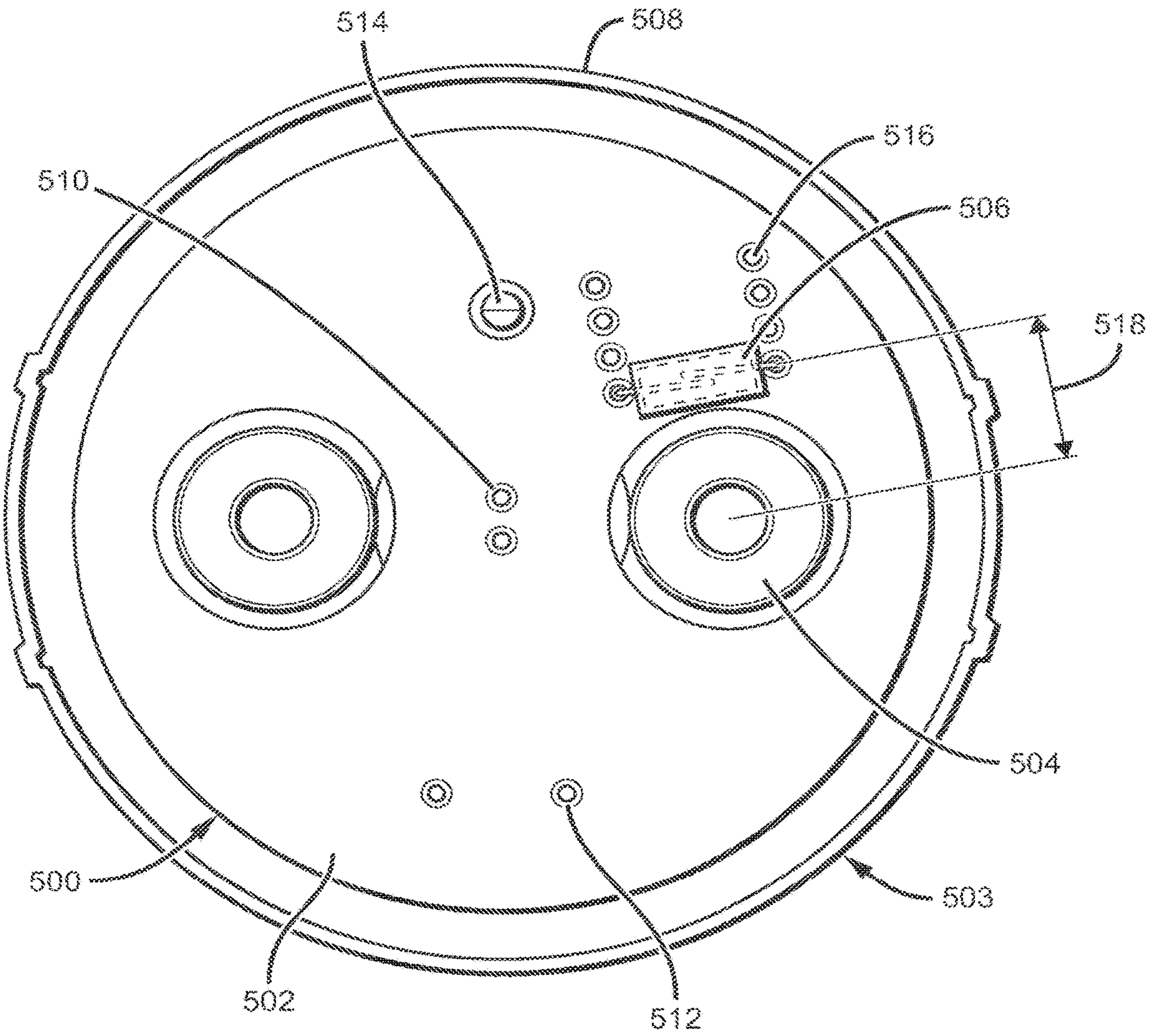
FIG. 7 is a back, top view of the pyrotechnic triggering configuration of FIG. 6.

In some of the embodiments, the PCB 502 comprises a plurality of passive trigger switch mounting features 516, which allow the pyrotechnic triggering configuration 500 to be adjusted according to desired trip current. For example, FIG. 7 shows the pyrotechnic triggering configuration 500, PCB 502, the electrical device 503, the electrical power terminals 504, the passive trigger switch 506, the body 508, the pyrotechnic pins 510, the coil pins 512, the tubulation structure 514, and the trigger switch mounting features 516. As shown in FIG. 7, the desired trip current can be adjusted by mounting the passive trigger switch 506 to a different one of the trigger switch mounting features 516, which in turn adjusts the trip distance 518 between the passive trigger switch 506 and one or more of the electrical power terminals 504.

By adjusting the trip distance 518 between the passive trigger switch 506 and one or more of the power terminals 504, the amount of current flowing through the device 503 that is required to activate the passive trigger switch 506, and therefore trigger the device's internal pyrotechnic features, can be adjusted. For example, the passive trigger switch 506 can comprise a reed switch that is configured to activate when a pre-determined magnetic field is generated due to a pre-determined level of current flowing through the power terminals 504. The strength of the magnetic field needed to trigger the passive trigger switch 506, and therefore the level of corresponding current flowing through he device required to trigger the passive trigger switch 506, can be adjusted by simply changing the trip distance 518 between the passive trigger switch 506 and the power terminals 504. In the embodiment shown, this can be accomplished by mounting the passive trigger switch 506 to a different passive trigger switch mounting feature 516.

By moving the passive trigger switch 506 farther from the power terminal 504, a greater magnetic field, and therefore a greater current, would be required to trigger the passive trigger switch 506 and therefore trigger the pyrotechnic features of the device 503. This can provide a pre-designed switching device with a pre-designed PCB so that the device can be mass manufactured, while allowing for different trip currents based upon placement of the passive trigger switch 506 at a different one of the passive trigger switch mounting features 516. For example, the passive trigger switch mounting features 516 can be on locations of the PCB 502 corresponding to different levels of magnetic field strength, which in turn can correspond to different levels of desired trip current. A company can manufacture one PCB configuration and can place the passive trigger switch 506 at different passive trigger switch mounting features 516 to create devices that will trip at different currents. In embodiments utilizing a coil or solenoid, for example as with contactors, the passive trigger switch 506 can be configured to turn off power to the coil. In these embodiments, this configuration can decrease the time it takes for the pyrotechnic features to open the contacts as it will not have to resist the coil.

Figure 8:
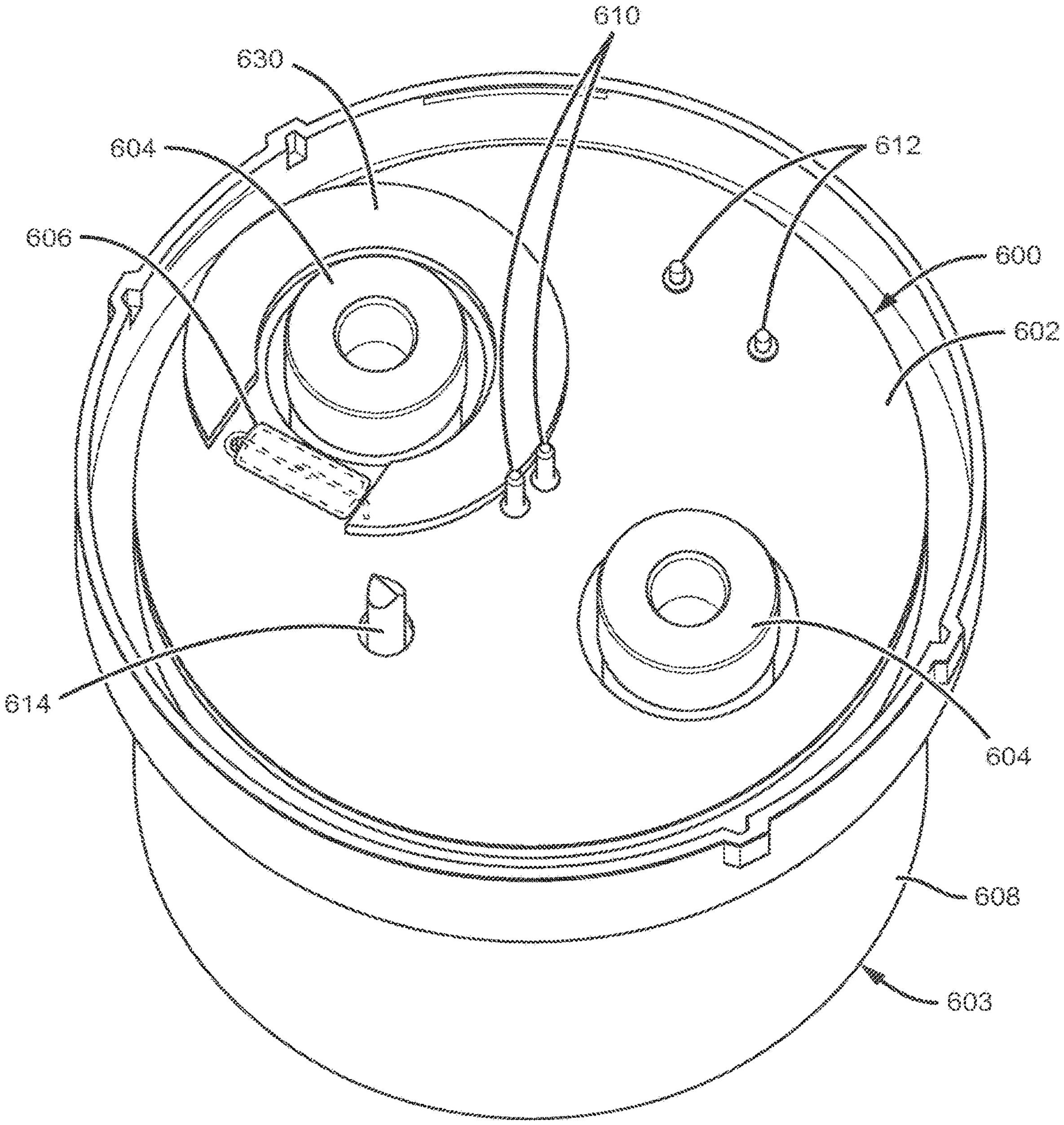
FIG. 8 is a front, top, perspective view of another pyrotechnic triggering configuration incorporating features of the present invention.

In other embodiments, additional features can be included in lieu of, or in addition to, the trigger switch mounting features 516 in order to further interact with the passive trigger switch 506. For example, FIG. 8 shows a device 602 having a pyrotechnic triggering configuration 600 similar to pyrotechnic triggering configuration 500 in FIGS. 6 and 7. The device 603 include a PCB 602 (similar to the PCB 502 in FIG. 7), an electrical device 603 (similar to the electrical device 503 in FIG. 7), and electrical power terminals 604 (similar to electrical power terminals 504 in FIG. 7). The device 603 further comprises a passive trigger switch 606 (similar to the passive trigger switch 506 in FIG. 7), a body 608 (similar to the body 508 in FIG. 7), pyrotechnic pins 610 (similar to the pyrotechnic pins 510 in FIG. 7), coil pins 612 (similar to coil pins 512 in FIG. 7), and a tubulation structure 614 (similar to the tubulation structure 514 in FIG. 7).

Although similar embodiments could include trigger switch mounting features, the embodiment shown in FIG. 8 does not include trigger switch mounting features. Instead, the pyrotechnic triggering configuration 600 includes a core structure 630 that contributes to determining the targeted trip current of the pyrotechnic triggering configuration 600.

The core structure 630 can comprise any known material that can channel, direct, or control a magnetic field generated by current flowing through the device 603. For example, in some embodiments, the core structure 630 comprises metal. In some embodiments, the core structure 630 comprises iron, a ferrous alloy or another ferrous material. In some embodiments, the core structure 630 is magnetic. The core structure 630 can comprise any suitable shape or configuration that produces the desired magnetic field characteristics, including any regular or irregular polygon or a custom shape. In the embodiment shown in FIG. 8, the core structure 630 comprises a curved strip-shape. The core structure 630 can be configured in any spatial position in relation to the device 603 and the PCB 602 to facilitate interaction between a generated magnetic field and the passive trigger switch 606. In the embodiment shown in FIG. 8, the core structure 630 at least partially surrounds one of the electrical power terminals 604 and is adjacent to the passive trigger switch 606.

Figure 9:
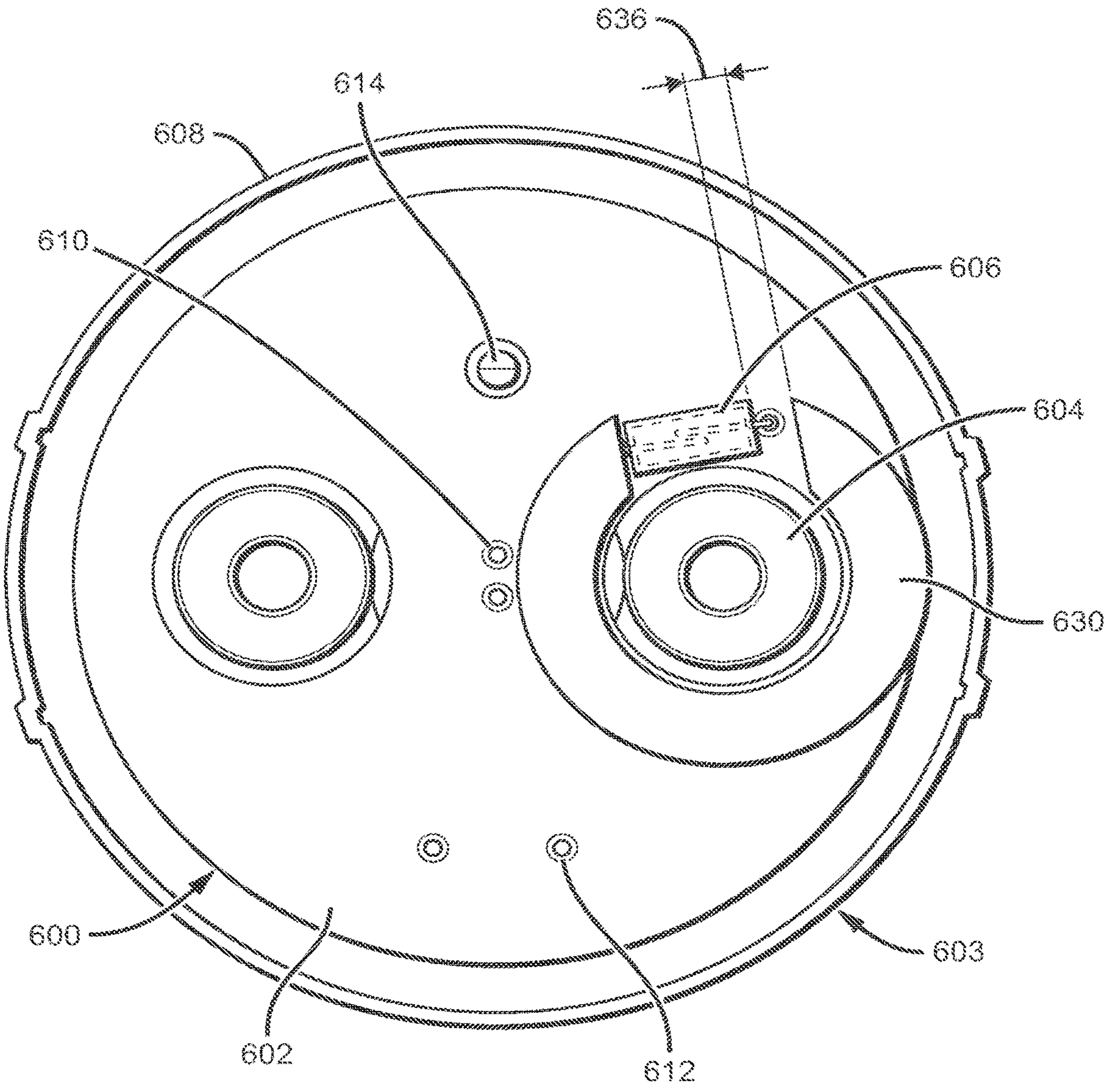
FIG. 9 is a back, top view of the pyrotechnic triggering configuration of FIG. 8.

The magnetic field generated from the core structure 630 can more significant than that of the power terminal itself, and the desired trigger current can be controlled by adjusting the distance between a portion of the core structure 630 and the passive trigger switch 606, rather than from the power terminal 604 and the passive trigger switch 606 as in the embodiment of FIGS. 6-7. For example, FIG. 9 shows the pyrotechnic triggering configuration 600, the PCB 602, the electrical device 603, the electrical power terminals 604, the passive trigger switch 606, the body 608, the pyrotechnic pins 610, the coil pins 612, the tubulation structure 614, and the core structure 630. FIG. 9 further shows the trip distance 636 between the passive trigger switch 606 and the core structure 630. Like with the embodiment of FIGS. 7-8, the passive trigger switch 606 can comprise a reed switch, or other passive mechanism, that is configured to activate when a pre-determined magnetic field is generated due to a pre-determined level of current flowing through the power terminal 604 and/or the core structure 630.

The strength of the magnetic field needed to trigger the passive trigger switch 606, and therefore the level of corresponding current flowing through the device required to trigger the passive trigger switch 606, can be adjusted by simply changing the trip distance 636 between the passive trigger switch 606 and a portion of the core structure 630. By moving the passive trigger switch 606 farther from the core structure 630, a greater magnetic field, and therefore a greater current, would be required to trigger the passive trigger switch 606 and therefore trigger the pyrotechnic features of the device 603.

In some embodiments, in lieu of or in addition to trigger switch mounting features 606 or a core structure 630, an external triggering mechanism can be utilized. In some embodiments, this external triggering mechanism can replace the need for a PCB, although in other embodiments, the external triggering mechanism can be utilized in addition to a PCB. An example embodiment, wherein an external triggering mechanism replaces the need for a PCB is shown in FIG. 10. FIG. 10 shows a pyrotechnic triggering configuration 700 (similar to pyrotechnic triggering configuration 600 in FIG. 8). The configuration 700 comprises an electrical device 703 (similar to the electrical device 603 in FIG. 8), electrical power terminals 704 (similar to electrical power terminals 604 in FIG. 8), a passive trigger switch 706 (similar to the passive trigger switch 606 in FIG. 8), a body 708 (similar to the body 608 in FIG. 8), pyrotechnic pins 710 (similar to the pyrotechnic pins 610 in FIG. 8), access points 712, which can provide wire access to an internal solenoid or coil, and a tubulation structure 714 (similar to the tubulation structure 614 in FIG. 8). FIG. 10 also shows the body 708 comprising a top or cap portion 716, through which the power terminals 704 protrude.

It is understood that a similar top or cap portion to the cap portion 716 of the body 708 shown in FIG. 10 can be applied to all other embodiments incorporating features of the present invention. For example, it is understood that the device embodiments of FIG. 6 and FIG. 8 are shown without a cap portion in order to better illustrate the underlying PCB configurations. However, during final assembly, the embodiments of FIG. 6 and FIG. 8 can have all internal components completely enclosed within the body and comprise a cap portion of the body.

The embodiment of FIG. 10 further shows an external triggering mechanism 730, which comprises the passive trigger switch 706, a conductive bus bar 732, and a spacer portion 734. As is shown in FIG. 10, the conductive bus bar 732 can comprise multiple connection portions, with the conductive bus bar 732 in the embodiment shown comprising a first connection point 736, which is configured to connect to the device 708 at one of the power terminals 704, and a second connection point 738 configured to connect to an outside power source.

The conductive bus bar 732 can comprise any conductive material, for example, a metallic material. In some embodiments, the conductive bus bar 732 comprises copper. The spacer portion 734 can comprise a non-magnetic material. The conductive bus bar 732 can be configured to allow current to flow to the pyrotechnic pins 710 and therefore to trigger the internal pyrotechnic features of the device 703. The passive trigger switch 706, similar to the passive trigger switches in the embodiments of FIGS. 6 and 8, is configured in an open state, that does not allow electrical current to pass though the conductive bus bar 732 and therefore to allow triggering of the pyrotechnic features.

When the current from the device 703 reaches a threshold level, a sufficient magnetic field is generated to trigger the passive trigger switch 706. This allows current from the external power source connected to the second connection 738 of the conductive bus bar 732 to flow through the conductive bus bar 732 to the pyrotechnic pins 710 and therefore trigger the pyrotechnic features of the device.

The threshold magnetic field needed to activate the passive trigger switch 706, and therefore the necessary current level defined as sufficiently dangerous to warrant activating the pyrotechnic circuit-breaking features, can be adjusted by adjusting the distance of the passive trigger switch 706 from the conductive bus bar 732. This can be achieved, for example, by adjusting the thickness of the non-magnetic spacer portion 734. For example, FIG. 11 shows a close-up sectional view of the external triggering mechanism 730 of FIG. 10, including the passive trigger switch 706, the conductive bus bar 732, and the spacer portion 734, the first connection point 736, and the second connection point 738. FIG. 11 also shows the trip distance 750, which corresponded to the thickness of the non-magnetic spacer portion 734.

Like with the embodiments discussed above, the passive trigger switch 706 can comprise a reed switch, or other passive mechanism. The switch can be configured to activate when a pre-determined magnetic field is generated due to a pre-determined level of current flowing through the power terminal 604, in this case, the power terminal 604 that is in electrical connection with the external triggering mechanism 730. The strength of the magnetic field needed to trigger the passive trigger switch 706, and therefore the level of corresponding current flowing through the device 703 required to trigger the passive trigger switch 706, can be adjusted by simply changing the trip distance 750 between the passive trigger switch 706 and the conductive bus structure 732. By increasing the thickness of the non-magnetic spacer portion 734, and therefore moving the passive trigger switch 706 farther from the conductive bus structure 732, a greater magnetic field, and therefore a greater current, would be required to trigger the passive trigger switch 706 and therefore trigger the pyrotechnic features of the device 703. Likewise, by moving the passive trigger switch 706 closer to the conductive bus structure 732, a lesser magnetic field, and therefore lesser current, would be required to trigger the passive trigger switch 706 and therefore trigger the pyrotechnic features of the device 703.

It is understood that the different pyrotechnic passive switching circuits can be arranged in many different ways according to the present invention. FIG. shows a simplified schematic of one embodiment of pyrotechnic passive switching circuit 800 according to the present invention. The circuit 800 generally comprises an operating power circuit 802 that comprises the standard operating power source 804 coupled to an operating load 806 that is energized and powered by the power source 802. A contactor or fuse 808 is arranged in the circuit 800 to break the electrical connection between the power source 804 and the load when dangerous current flows in the circuit 802. It is understood that the fuse 808 can also be included with features to operate as a contactor to disconnect the power source 804 from the load during normal operating conditions. It is also understood that fuse 808 can comprise a contactor where the passive switching circuit 800 operates to change the condition of the contactor to break the circuit path as described above.

A pyrotechnic activation circuit 810 can be included that is arranged to work with the operating power circuit 802 to protect against overcurrent conditions. The circuit 810 comprises a pyrotechnic actuator/activator 812 as described above, that is arranged to change the condition of the fuse 808 when activated. The circuit also includes an overcurrent actuated pyrotechnic fuse trigger 814 that is arranged adjacent to the circuit 802 in a position that permits it to sense an overcurrent condition in the circuit 802. In the embodiment shown, the trigger 814 can comprise a reed switch, but it is understood that many different alternative devices can be used. The trigger 814 can be placed in many different locations in relation to the circuit 802, such as adjacent a power terminal as described above, or adjacent other conductors in the circuit carrying operating current. The circuit 810 can also comprise a secondary power source 816 that can be coupled to the pyrotechnic actuator 812 when the fuse trigger is closed in response to elevated current levels.

During operation, the fuse 808 is closed, allowing the operating power source power 804 to power the load 806. When normal current levels flow through the circuit 802, the trigger 814 remains open and secondary power source 816 is disconnected from the pyrotechnic actuator 812. When currents above a certain level (dangerously high levels) flow through the circuit 802, the trigger 814 closes in response to the elevated magnetic field. This connects the secondary power source to the pyrotechnic actuator 812, causing it to actuate and break the fuse 808. This in turn disconnects the operating power source 804 from the load 806, to break the conductive path for the elevated current in the circuit 802.

It is understood that other circuits according to the present invention can be arranged in many different ways with many different devices and elements. Many different secondary power sources can be used, with some embodiments using an integrated battery or capacitor circuit storing a charge sufficient to initiate the pyrotechnic actuator 812. In other embodiments the secondary power source can comprise an on-board low voltage power that is still sufficient to initiate the pyrotechnic actuator 812.

Figure 12:
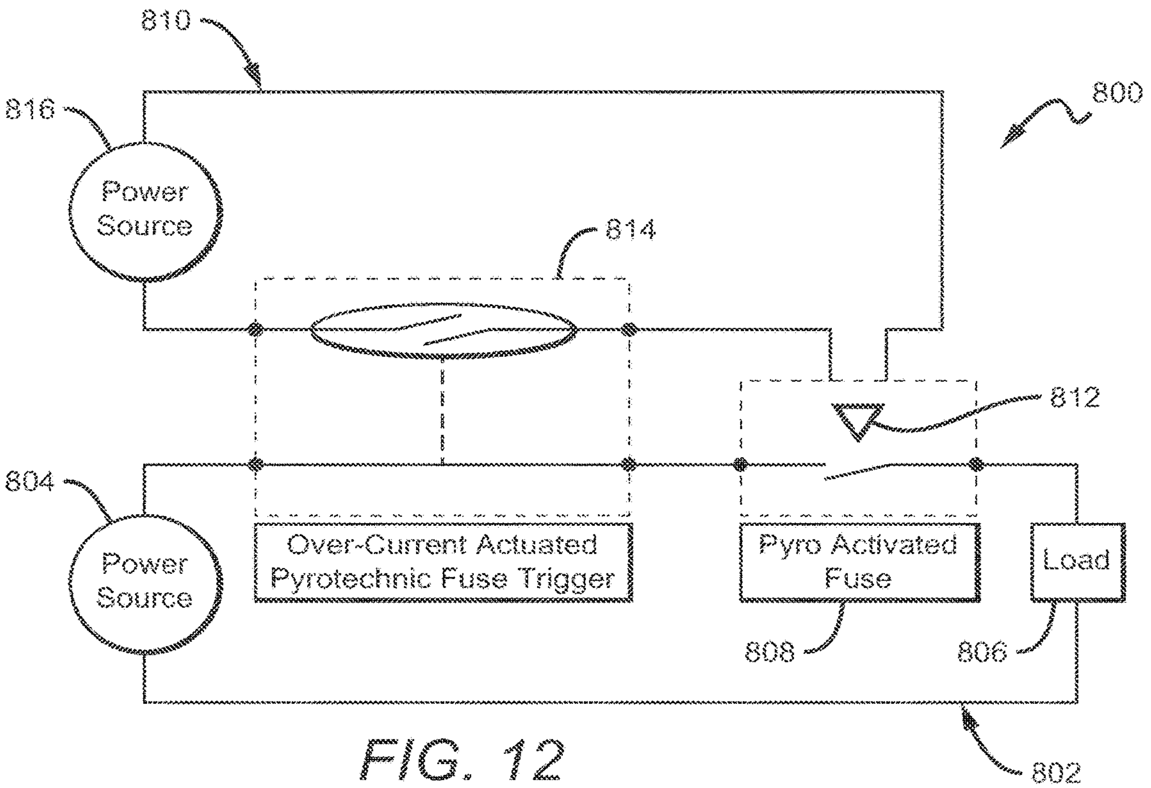
FIG. 12 is a schematic of one embodiment of a pyrotechnic power switching circuit according to the present invention.
Figure 13:
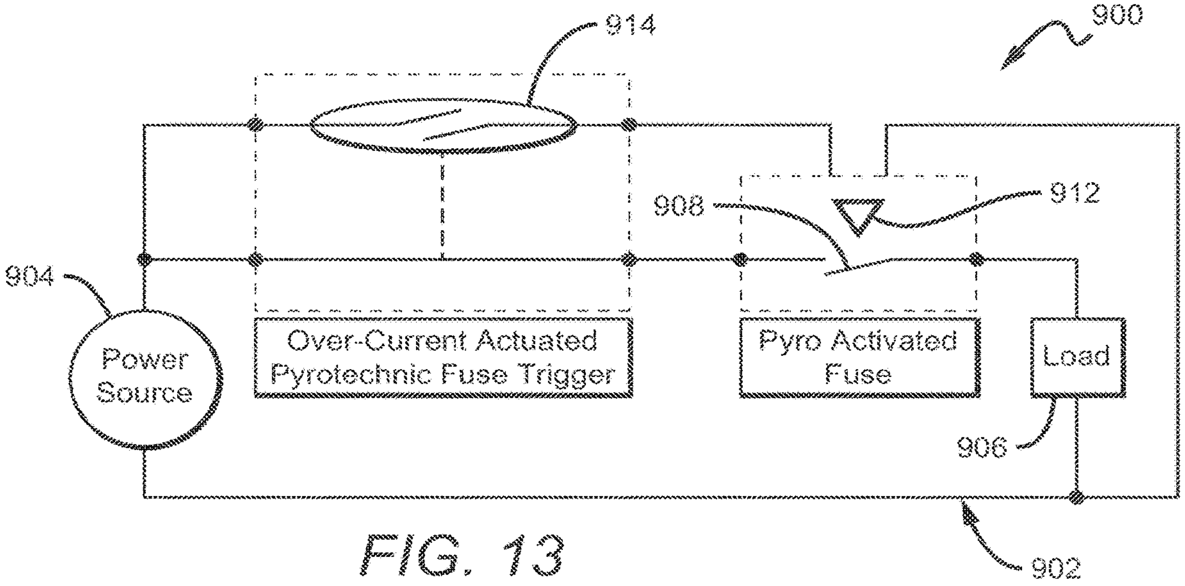
FIG. 13 is a schematic of another embodiment of a pyrotechnic power switching circuit according to the present invention.

FIG. 13 shows another embodiment of a pyrotechnic passive switching circuit 900 according to the present invention that contains many of the same features as the switching circuit 800 shown in FIG. 12. The circuit 900 comprises an operating power circuit 902 that comprises the standard operating power source 904 coupled to an operating load 906. A contactor or fuse 908 is arranged in the circuit 900 to break the electrical connection between the power source 904 and the load 906 when dangerous current flows in the circuit 902.

The circuit 900 includes pyrotechnic actuator/activator 912 and an overcurrent actuated pyrotechnic fuse trigger 914 similar to those described above. However, in the circuit 900 these elements are not arranged in a separate pyrotechnic activation circuit working with a secondary power source to initiate the pyrotechnic actuator 912. Instead, these elements are integrated with operating power circuit 902 with the trigger 914 arranged to sense elevated currents in the circuit 902 and also coupled to the circuit 902 at a conductor carrying the elevated current. In the embodiment shown, the trigger 914 is coupled to the circuit conductors in parallel with the fuse 908, but it is understood that it can be arranged in other ways.

During normal operation, the trigger 914 is open and power from the power source 904 is conducted to the load 906, through the fuse 908. When the trigger 914 senses elevated current, it closes and the elevated current passes through the trigger 914 to the pyrotechnic actuator 912, initiating the actuator and breaking the fuse 908. This breaks the normal conduction path between the power source 904 and load 908.

The trigger 914 is also arranged such that the elevated current from the power source 904 quickly ruptures or otherwise destroys the trigger 914, thereby breaking the current path through the trigger 914. The trigger 914 carries the current long enough to activate the actuator, but is destroyed shortly thereafter. This results in the power source 904 being electrically isolated from the load 906 and any elevated current path being broken. It is understood that the trigger 914 and actuator 912 can have elements that contain them during rupture or initiation, such as an encasing material like epoxy.

It is also understood that the elements of the circuits according to the present invention can be coupled together using many different electrical conductors. This can include conductive paths on a printed circuit board, or wires. It is also understood that the circuits described above can be arranged on and integral to the contactor or fuse, to provide an easy to use and compact device. The circuit 900 can provide certain advantages, such as not requiring a separate secondary power source to activate the pyrotechnic actuator 912. This can result in a simplified and less expensive device.

Different embodiments of the present invention can initiate the pyrotechnic charge using many different active and passive circuits and elements. Some alternative arrangements according to the present invention can rely on contact levitation and related arcing to passively trigger the pyrotechnic charge. Contact levitation can occur when the moveable contact separates from the fixed contacts due to the electromagnetic forces generated during elevated current flow through the contacts during operation.

Although the inventors do not want to be limited to any one theory of operation, is it is understood that there can be at least three factors that result in levitation between the contacts. The first is current constriction, the second is due to parallel conductors with current flow in opposing directions, and the third is current flow perpendicular to the field of the arc suppression magnets. It understood that moving charges create their own magnetic fields, with current carrying conductors capable of enacting forces on one another. Parallel currents in conductors can cause magnetic fields that result in an attraction between the conductors. Antiparallel currents can create magnetic fields that cause repulsion between the conductors. Levitation occurs as the result of the magnetic field generated by a current in the switching device's internal contacts.

Figure 14:
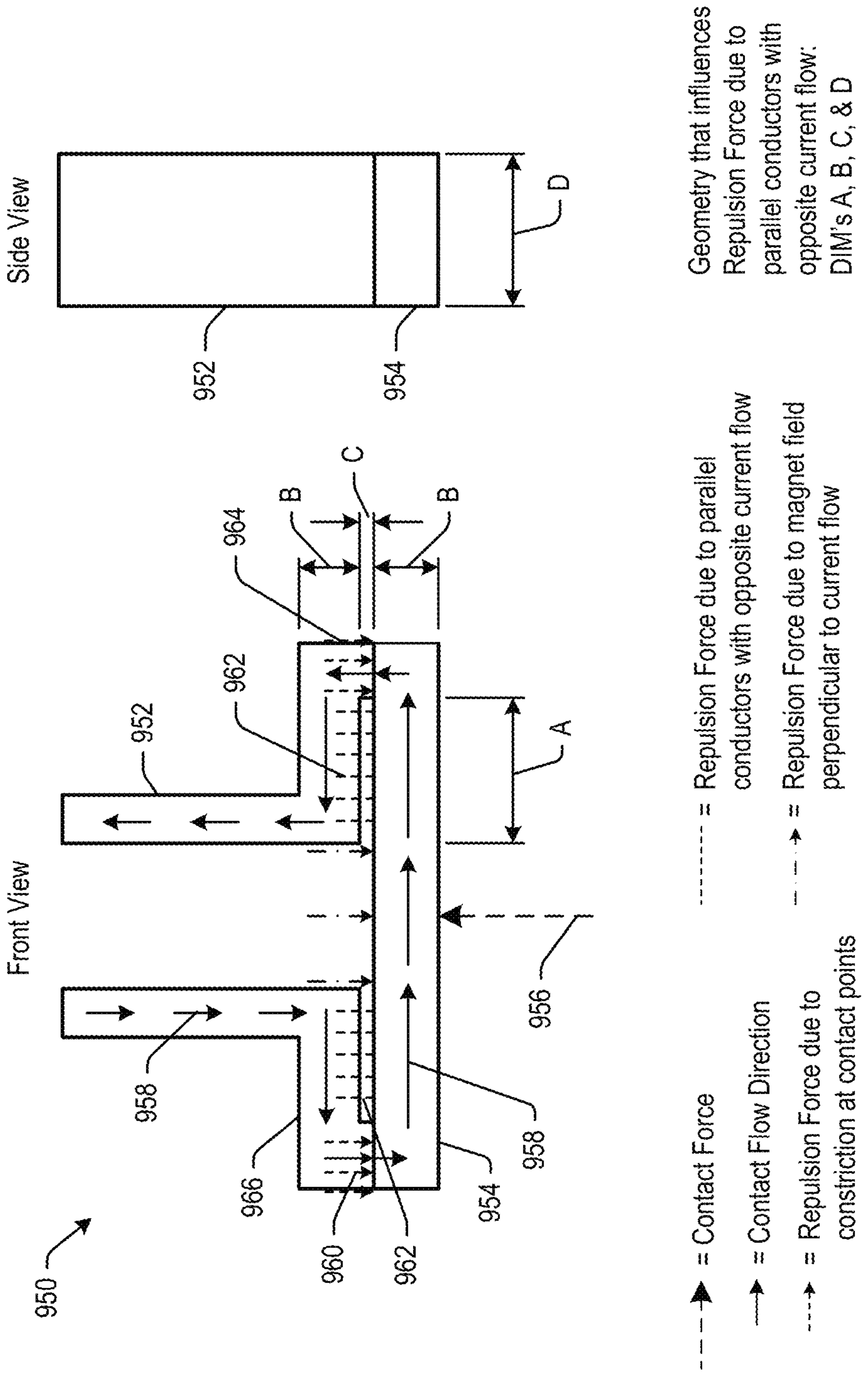
FIG. 14 shows schematic views of a switching device according to the present invention.
Figure 15:
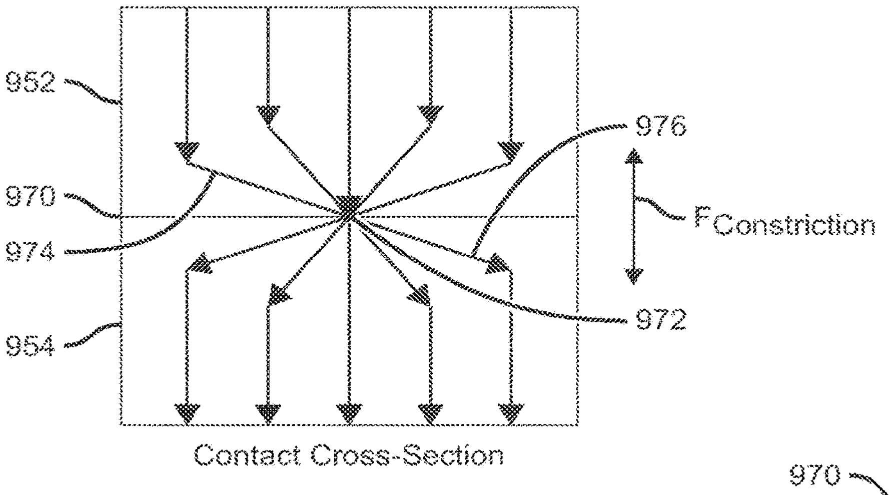
FIG. 15 is a schematic plan view of the fixed and movable contacts for switching device according to the present invention.
Figure 16:
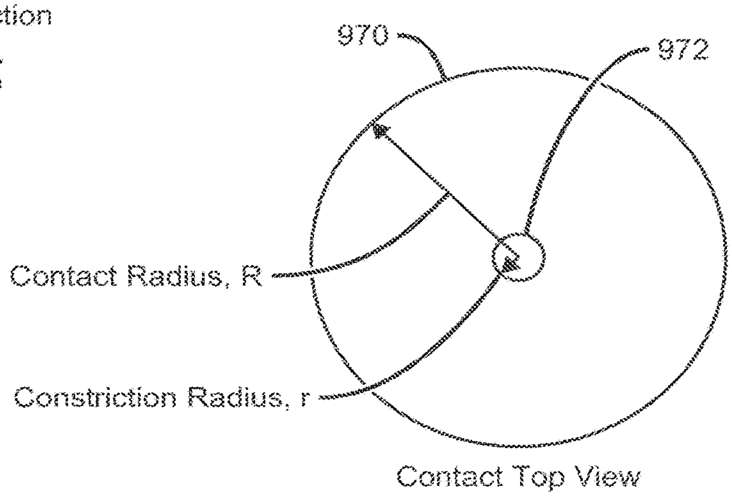
FIG. 16 is a top view of the interface between the fixed and movable contacts shown in FIG. 15.

FIGS. 14-16 are schematic representations of features of a switching device 950 showing these three levitation factors. The switching device 950 comprises a stationary contact 952 and a movable contact 954, with operation of the switching device resulting from movement of the movable contact 954 between contacting the stationary contact 952, and moving (e.g. down) out of contact with the stationary contact 952. The movable contact 954 has a holding force 956 when it is in contact with the stationary contact 952.

The first and second factors (current constriction and parallel conductors) can be influenced by the geometry of the stationary and movable contacts 952, 954. In the embodiment shown, some of the relevant geometric features comprise the length of the contact bend A, the contact thickness B, the contact bend spacing C, and the contact width D.

Current constriction relates to the repulsive forces that can be generated between the contacts by currents conducting between the two contacts across less than the entire contact surface. FIG. 15 shows a schematic representation the contact area between the stationary contact 952 and the movable contact 954, with interface 970 between the two. FIG. 16 also shows interface 970 from a top view. When conducting electricity between the stationary and movable contacts 952, 954, current does conduct equally across the contact surface at the interface 970 between the two. Instead, current is typically restricted to small regions 972 (i.e. current constriction) at the contact interface 970. This causes the current flowing through the contacts to change direction toward the region 972. This in turn creates first and second current vectors 974 and 976 in the opposing contacts that have a component that is substantially parallel to the interface 970. The parallel components are in opposite directions creating magnetic fields that are opposite to one another. This in turn creates a repulsive force between the contacts 952, 954.

As the current flowing through the contacts increases, this repulsive force can also increase, and the repulsive acts on the contacts in a direction against the contact holding force 956. This repulsive force can be significant at higher currents, and levitation between the contacts can occur when this repulsive force exceeds the force 956 between the contacts. This levitation force in turn can cause the movable contact 954 to separate from the stationary contact 952 against the contact holding force 956.

Referring again to FIG. 14, the current flowing through the contacts 952, 954 can similarly cause a repulsive force between the two. The current flow 958 during operation conduct through the stationary contact 952 and the movable contact 954. The stationary contact bend 966 has a length A where current is flowing in the opposite direction to the current 958 flowing in the movable contact 954. This also creates opposing magnetic fields that creates a repulsive force between the contacts 952, 954. This repulsive force can also increase as the current 958 increases.

The positioning of the arc suppression magnets can also contribute to levitation. Some embodiments of a switching device can comprise arc magnets that can be positioned such that arcs between stationary and movable contacts are pushed outward. This magnet configuration can result in unidirectional break performance with the contacts. The orientation of the magnets can also result in the movable contact being forced downward in opposition to the closing force between the contacts. Electrons moving through a magnetic field can be moved in a particular direction. As shown in FIG. 14, a further repulsive force 964 between the contacts 952, 954 can be created by the interaction of the perpendicular magnetic field of the arc magnets and the electrons in the current 958.

Arcing can occur between the fixed and movable contacts when levitation causes separation of the fixed and moveable contacts. Some of the variables used to determine the current at which the levitation force begins to open (or separate) the contacts are the contact closing force, adjacent parallel geometry of the stationary contact and movable contact, and arc magnets.

In the embodiments described above, different systems and methods for triggering or initiating the pyrotechnic actuator are disclosed, which rely on externally powered triggering or integrated triggering of the pyrotechnic actuator and charge. In some of these embodiments, devices such as reed switches are used, which can close in response to an elevated contact current, in turn can close one of a variety of power sources to the pyrotechnic actuator. In these embodiments, the reed switch (or switching device) can be calibrated to close when the predetermined trip current threshold is surpassed. In the present embodiments, levitation arcing can be used to initiate the pyrotechnic actuator or charge, without the need for additional elements such as a reed switch.

Figure 17:
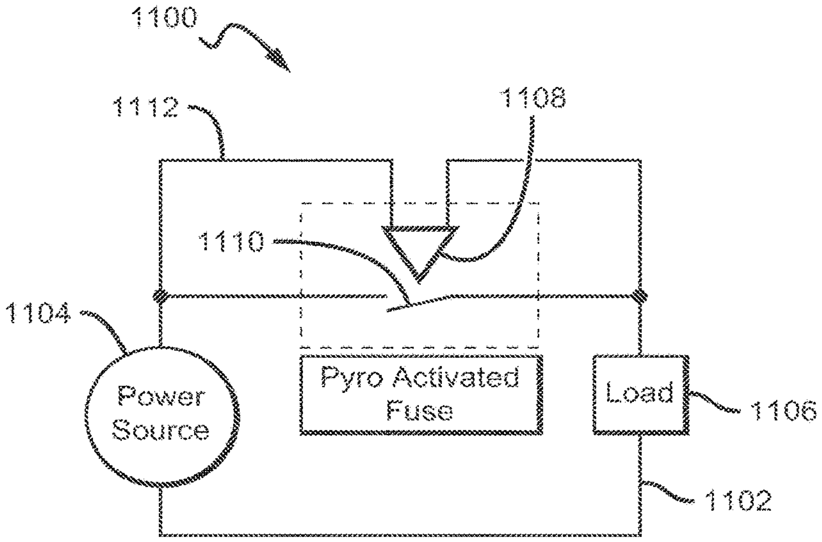
FIG. 17 is a schematic of another embodiment of pyrotechnic switching circuit according to the present invention.

FIG. 17 shows another embodiment of a pyrotechnic passive switching circuit 1100 according to the present invention that relies on the levitation arcing to trigger the pyrotechnic actuator. Like the circuits above, the circuit 1100 comprises an operating power circuit 1102 that comprises the standard operating power source 1104 coupled to an operating load 1106. A pyrotechnic activated fuse 1108 is arranged in the circuit 1100 and uses a pyrotechnic charge to break the electrical connection 1110 between the power source 1104 and the load 1106 when dangerously high current flows in the circuit 1102. This can be accomplished as described above by the pyrotechnic charge separating the contacts in the contactor.

Unlike the embodiments above, the circuit 1100 does not have an overcurrent actuated pyrotechnic fuse trigger, such as a reed switch. Instead, the initiator pins for the pyrotechnic fuse (or device) are connected directly across the contactor high voltage terminals. As current levels through the contactor's fixed contacts (i.e. through the high voltage terminals) rise above a threshold or "trip current", levitation force overcomes the contact force between the stationary and movable contacts. This causes separation between the fixed and movable contacts, and levitation arcing occurs between the two. During arcing the resistance increases rapidly between the high voltage terminals and the movable contacts. This causes the current to pass through the initiator path 1112, because it becomes the path of least resistance. The pyro charge in the pyro activated fuse 1108 ignites, rapidly producing heat and pressure. This forces the contact's internal plunger through the barrel and onto the movable contact as described in the embodiments above. The movable contact rapidly separates from the stationary contact, and arc magnets can be included to stretch and cool the arc, as described above.

It is understood that although the pyrotechnic fuse/device is described above as being connected directly to the high voltage terminals, in other embodiments intervening devices and features can be included. This can include, for example, different electronic or sensing features that can be arranged in many different ways in or on the switching devices according to the present invention. This also includes some embodiments that can be arranged on a printed circuit board.

It is also understood that different contactor embodiments can have multiple pyrotechnic triggering mechanisms. For example, in some embodiments it may be desirable to have both active and passive triggering features for a contactor. This can be arranged by either having two triggering circuits to the same pyro initiator and charge, or by including two different initiators and charges. In embodiments with multiple initiators, the first initiator can be connected to the high voltage terminals as described above for activation by levitation arcing. The second initiator can be connected to contactor's output pins for coupling to the desired active triggering circuit. The two initiators and their triggering circuits can be electrically isolated from one another.

Figure 18:
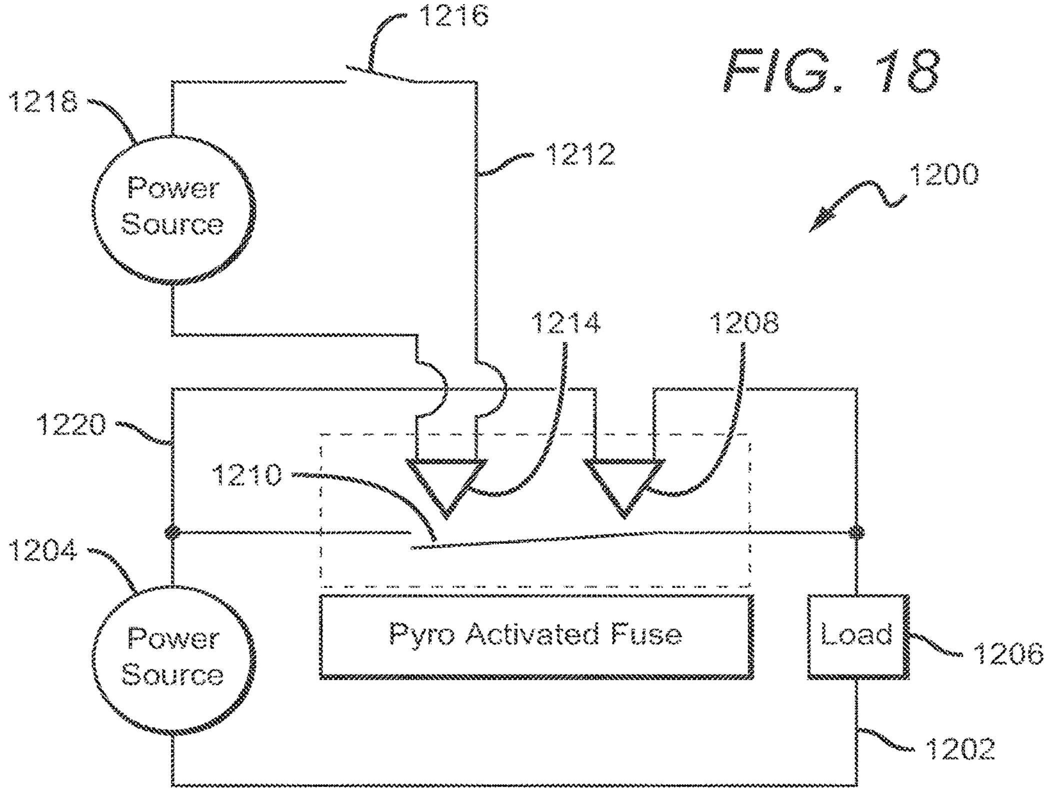
FIG. 18 is a schematic of still another embodiment of a pyrotechnic switching circuit according to the present invention.

FIG. 18 shows another embodiment of a pyrotechnic switching circuit 1200 according to the present invention including both active and passive triggering circuits. Like the circuits above, the circuit 1200 comprises an operating power circuit 1202 that comprises the standard operating power source 1204 coupled to an operating load 1206. First and second pyrotechnic initiators 1208, 1214 are arranged in the circuit 1200 to break the electrical connection between the power source 1204 and the load 1206 when dangerous current flows in the power circuit 1202. In this embodiment, one of the initiators 1208 is passive (automatically actuated at elevated current), while other 1210 can be manually actuated by a signal from the user or from the system. In other embodiments, two or more initiators can be provided to have redundant mechanisms for interrupting dangerous currents.

An external pyrotechnic activation circuit 1212 can comprise features to sense when an elevated current is flowing in the power circuit. In the embodiment shown, the circuit 1212 comprises a pyrotechnic actuator/activator 1214 as described above, that is arranged to change the condition of the fuse 1208 when activated. The circuit also includes an overcurrent actuated pyrotechnic fuse trigger 1216 that is arranged adjacent to the circuit 1202 in a position that permits it to sense an overcurrent condition in the circuit 1202. In the embodiment shown, the trigger 1216 can comprise a reed switch, but it is understood that many different alternative devices can be used. The circuit 1212 can also comprise a secondary power source 1218 that can be coupled to the pyrotechnic actuator 1214 when the fuse trigger is closed in response to elevated current levels.

An internal passive activation circuit can be included that comprises the contact levitation arcing activation arrangement described above. As discussed above, the initiator pins for the pyrotechnic fuse 1208 are connected directly across the contactor high voltage terminals. As elevated currents through the contacts reach the desired trip level, levitation arcing occurs. This forces the current through the initiator path 1220 (e.g. the patent of least resistance). The pyro activated fuse 1210 ignites and rapidly separates the movable contact from the stationary contacts as described above.

Similar to the embodiments described above, during operation the fuses 1208, 1210 are closed, allowing the operating power source power 1202 to power the load 1206. When normal current levels flow through the circuit 1204, the trigger 1216 remains open and secondary power source 1218 is disconnected from the pyrotechnic actuator 1210. When currents above a certain level (dangerously high levels) flow through the circuit 1202, the trigger 1216 closes in response to the elevated magnetic field, activating the pyrotechnic actuator 1210, which disconnects the operating power source 1204 from the load 1206.

It is understood that this is only one embodiment of a multiple pyro activation arrangement according to the present invention. It is understood that other embodiments can include different types of multiple activation systems, and other embodiments can include more than two activation systems.

Figure 19:
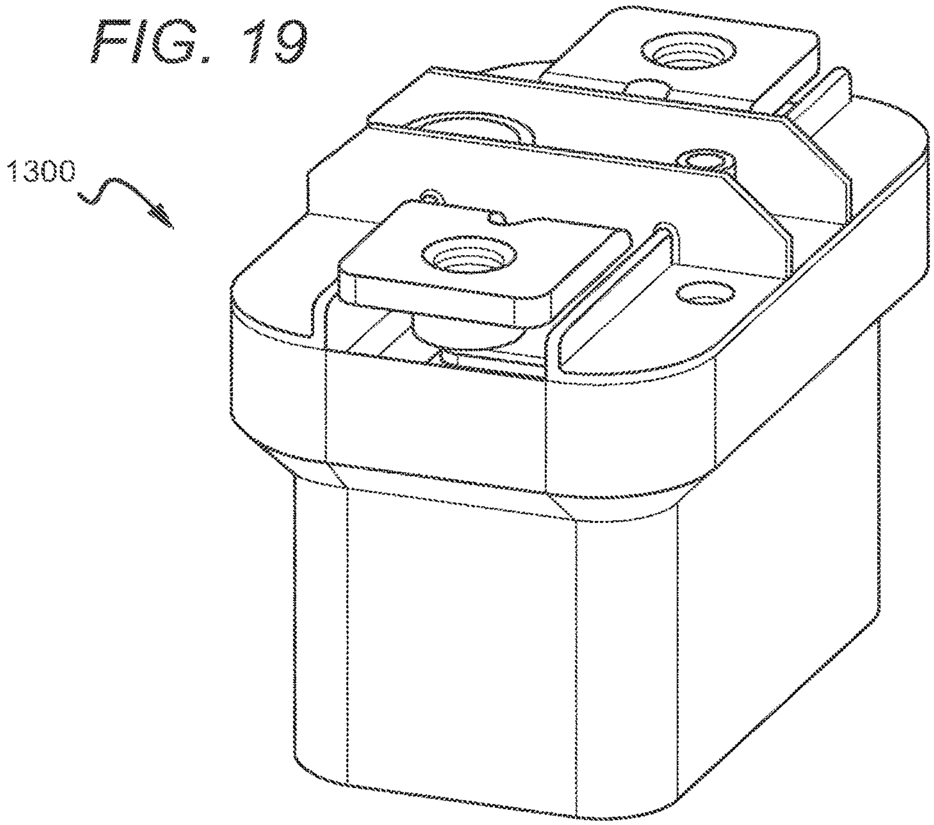
FIG. 19 is a perspective view of another embodiment of a switching device according to the to the present invention.
Figure 21:
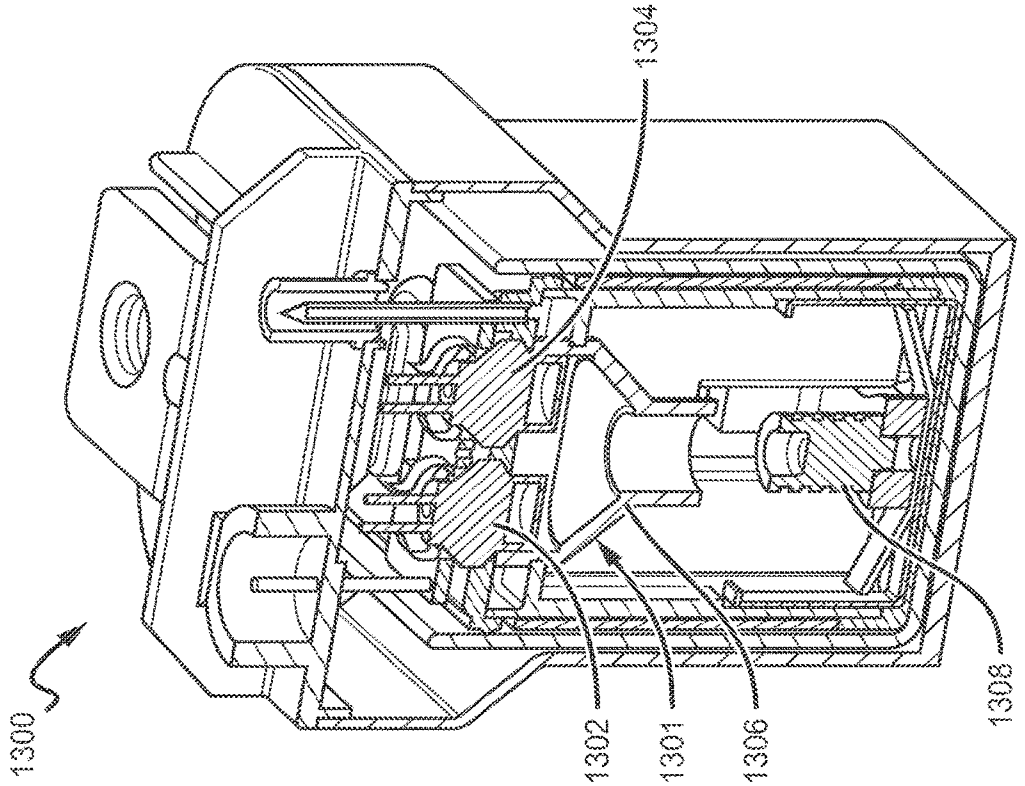
FIG. 21 is another sectional perspective view of the switching device shown in FIG. 19.
Figure 20:
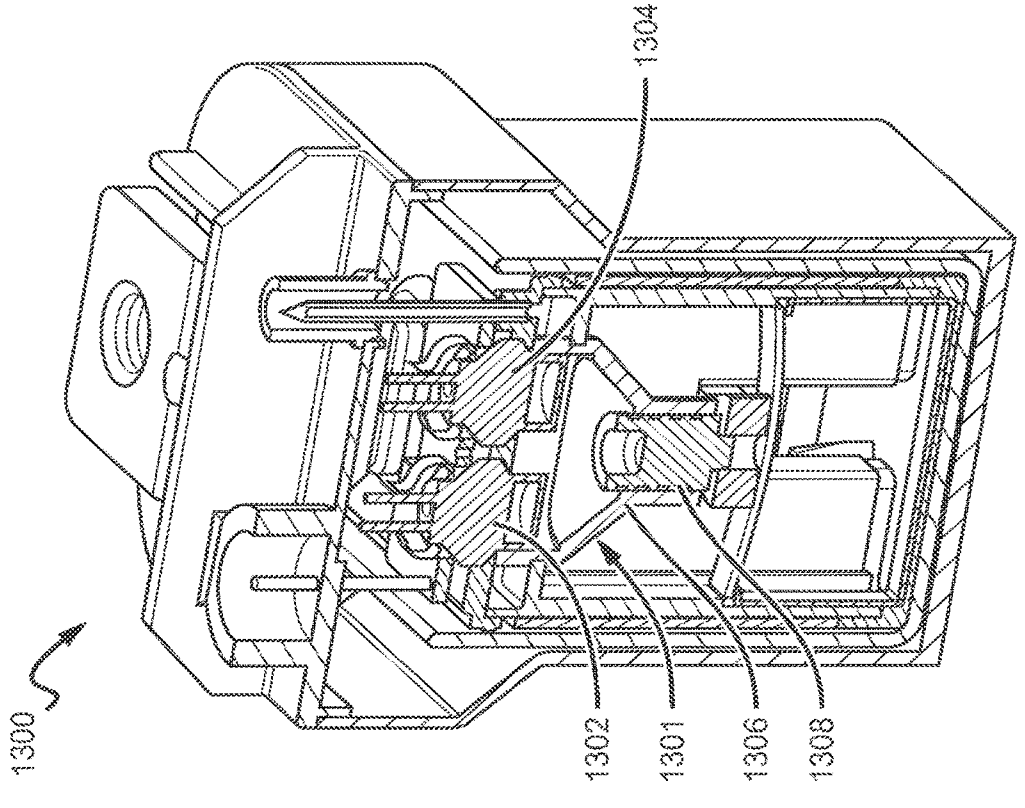
FIG. 20 is a sectional perspective view of the switching device shown in FIG. 19.
Figure 22:
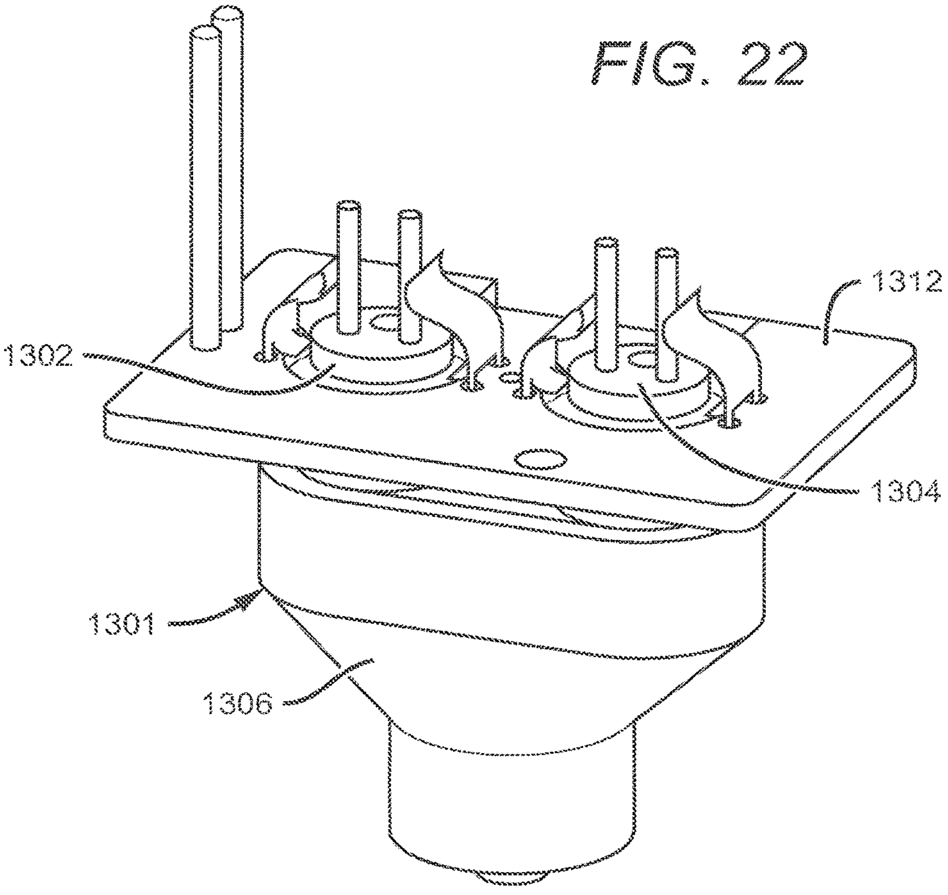
FIG. 22 is a sectional view of a multiple initiator component according to the present invention.
Figure 23:
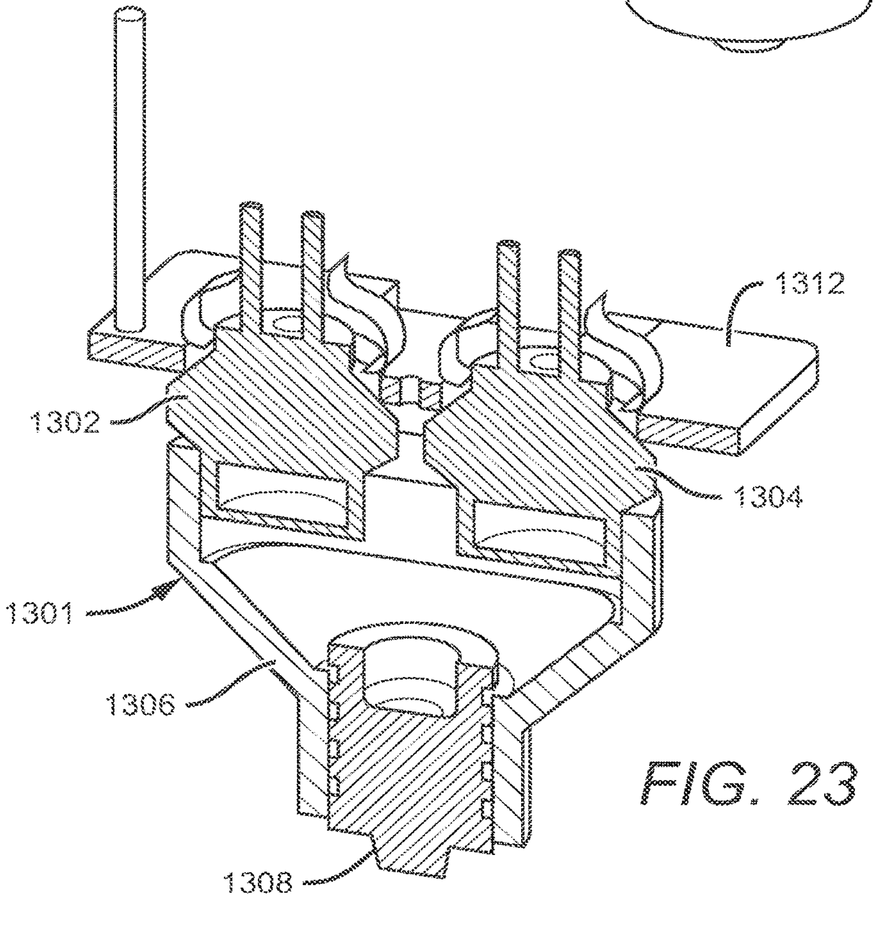
FIG. 23 is a sectional perspective view of the component shown in FIG. 22.

It is also understood that the multiple pyrotechnic actuators can be arranged in many different ways, in many different types of contactors and fuses. FIGS. 19 to 21 show one embodiment of a fuse 1300 and FIGS. 22 and 23 show its multiple initiator mechanism 1301 according to the present invention. The mechanism 1301 comprises first and second pyro initiators 1302, 1304, each of which has its own pyrotechnic charge. In the embodiment shown, the pyro initiators 1302, 1304 are arranged at the top of the fuse 1300, with both arranged at the top of a manifold barrel 1306. The pyro initiators 1302, 1304 can be hermetically sealed and centrally positioned in the manifold barrel 1306. The activation forces (i.e. heat and pressure) of the pyrotechnic charges in each of the initiators 1302, 1304 are directed by the manifold barrel to force a single common plunger 1308 down. The downward movement of the plunger 1308 causes separation of the fixed and movable contacts within the fuse 1300 as described in the embodiments above.

The initiators 1302, 1304 can be activated in different ways, as described above and in the embodiment shown and are electrically isolated from each other. The first initiator 1302 can be couple directly to the contactor's high voltage terminals and can be activated by contact levitation arcing as described above. The second initiator 1304 can be coupled to the fuses output pins 1310, which can be couple to an external activation circuit or other external activation means as discussed above. These electrical connections can be made using many different conductors arranged in many different ways. In the embodiment shown, the connections can be made at least partially through conductive traces on a printed circuit board (PCB) 1312.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention, wherein no portion of the disclosure is intended, expressly or implicitly, to be dedicated to the public domain if not set forth in any claims.

We claim:

1. An electrical switching device, comprising:

a housing;

at least one fixed contact disposed in the housing, the at least one fixed contact comprising a first portion and a second portion angled relative to the first portion; and a movable contact disposed in the housing, the movable contact being movable to configure the electrical switching device in a first state that allows current flow through the electrical switching device and a second state that interrupts current flow through the electrical switching device, wherein, in the first state, the first portion of the at least one fixed contact contacts the movable contact and the second portion extends substantially parallel to the movable contact, at a distance spaced from the movable contact; and a triggering device configured to transition the electrical switching device from the first state to the second state in response to levitation between the at least one fixed contact and the movable contact, the levitation occurring at an elevated current signal flowing through the electrical switching device.

2. The electrical switching device of claim 1, wherein the levitation results at least in part from a first electromagnetic force resulting from a current flowing at a contact between the first portion and the movable contact and a second electromagnetic force resulting from the current flowing in the second portion and the movable contact.

3. The electrical switching device of claim 1, wherein:

the movable contact is substantially linear along an axis between a first end and a second end;

the second portion is angled relative to the first portion by approximately 90-degrees; and with the switching device in the first state, the first portion contacts the movable contact proximate the first end or the second end with the second portion extending generally parallel to the axis.

4. The electrical switching device of claim 1, wherein the triggering device is connected to the at least one fixed contact.

5. The electrical switching device of claim 1, wherein the triggering device is a pyrotechnic device arranged to interact with the at least one fixed contact to transition from the first state to the second state.

6. The electrical switching device of claim 1, wherein the triggering device is arranged to interact with the movable contact to transition from the first state to the second state.

7. The electrical switching device of claim 1, wherein the at least one fixed contact and the movable contact are arranged so that levitation causes arcing between at least one fixed contact and the movable contact thereby increasing resistance between the at least one fixed contact and the movable contact.

8. The electrical switching device of claim 7, wherein the increased resistance causes activation of the triggering device.

9. The electrical switching device of claim 1, wherein the triggering device comprises a pyrotechnic.

10. The electrical switching device of claim 1, further comprising:

a passive trigger switch structure disposed in the housing and configured to activate the triggering device in response to levitation between the movable contact and at least one fixed contact; and an external switching feature configured to the triggering device based at least in part on a signal generated external to the housing.

11. An electrical switching device, comprising:

a housing;

a first fixed contact disposed in the housing;

a second fixed contact disposed in the housing, at least one of the first fixed contact or the second fixed contact comprising a first portion and a second portion angled relative to the first portion; and a movable contact disposed in the housing, the movable contact being movable to configure the electrical switching device in a closed state in which the movable contact contacts the first portion and the second portion extends substantially parallel to the movable contact, at a distance spaced from the movable contact, and an open state in which the movable contact is spaced from the first portion, wherein the first fixed contact, the second fixed contact, and the movable contact are arranged so that levitation causes arcing between at least one fixed contact and the movable contact thereby increasing resistance between the at least one fixed contact and the movable contact.

12. The electrical switching device of claim 11, further comprising:

a triggering device configured to transition the electrical switching device from the closed state to the open state in response to levitation between the at least one of the first fixed contact or the second fixed contact and the movable contact, the levitation occurring at an elevated current signal flowing through the electrical switching device.

13. The electrical switching device of claim 12, further comprising:

a passive trigger switch structure disposed in the housing and configured to activate the triggering device in response to levitation between the movable contact and at least one of the first fixed contact or the second fixed contact.

14. The electrical switching device of claim 12, further comprising:

an external switching feature configured to the triggering device based at least in part on a signal generated external to the housing.

15. The electrical switching device of claim 11, wherein the levitation results at least in part from a first electromagnetic force resulting from a current flowing at a contact between the first portion and the movable contact and a second electromagnetic force resulting from the current flowing in the second portion and the movable contact.

16. The electrical switching device of claim 11, wherein:

the movable contact is substantially linear along an axis between a first end and a second end;

the second portion is angled relative to the first portion by approximately 90-degrees; and with the electrical switching device in the closed state, the first portion contacts the movable contact proximate the first end or the second end with the second portion extending generally parallel to the axis.

17. The electrical switching device of claim 12, wherein the triggering device is connected to the first fixed contact and the second fixed contact.

18. The electrical switching device of claim 12, wherein the triggering device is a pyrotechnic device arranged to interact with at least one of the first fixed contact, the second fixed contact, or the movable contact to transition from the closed state to the open state.

19. The switching device of claim 12, wherein the triggering device is arranged to interact with the movable contact to transition from the closed state to the open state.

20. An electrical switching device, comprising:

a housing;

a first fixed contact disposed in the housing;

a second fixed contact disposed in the housing, at least one of the first fixed contact or the second fixed contact comprising a first portion and a second portion angled relative to the first portion; and a movable contact disposed in the housing, the movable contact being movable to configure the electrical switching device in a closed state in which the movable contact contacts the first portion and the second portion extends substantially parallel to the movable contact, at a distance spaced from the movable contact, and an open state in which the movable contact is spaced from the first portion, wherein:

the movable contact is substantially linear along an axis between a first end and a second end;

the second portion is angled relative to the first portion by approximately 90-degrees, and with the electrical switching device in the closed state, the first portion contacts the movable contact proximate the first end or the second end with the second portion extending generally parallel to the axis.

* * * * *